(12) United States Patent
Toronjo et al.

(10) Patent No.: US 11,744,325 B2
(45) Date of Patent: Sep. 5, 2023

(54) ARTICLE OF FOOTWEAR

(71) Applicant: Under Armour, Inc., Baltimore, MD (US)

(72) Inventors: Alan Toronjo, Portland, OR (US); Daniel Lee, Hong Kong (HK); Roger Fan, Hong Kong (HK)

(73) Assignee: Under Armour, Inc., Baltimore, MD (US)

( * ) Notice: Subject to any disclaimer, the term of this patent is extended or adjusted under 35 U.S.C. 154(b) by 354 days.

(21) Appl. No.: 16/717,605

(22) Filed: Dec. 17, 2019

(65) Prior Publication Data

US 2020/0196705 A1    Jun. 25, 2020

Related U.S. Application Data

(60) Provisional application No. 62/782,423, filed on Dec. 20, 2018.

(51) Int. Cl.
*A43B 23/07* (2006.01)
*A43B 23/02* (2006.01)
(Continued)

(52) U.S. Cl.
CPC .......... *A43B 23/07* (2013.01); *A43B 23/0235* (2013.01); *B32B 3/085* (2013.01); *B32B 3/266* (2013.01); *B32B 5/022* (2013.01); *B32B 5/04* (2013.01); *B32B 5/06* (2013.01); *B32B 7/022* (2019.01); *B32B 7/035* (2019.01); *B32B 7/04* (2013.01); *B32B 7/12* (2013.01); *B32B 27/12* (2013.01); *B32B 37/12* (2013.01); *B32B 37/144* (2013.01); *B32B 37/203* (2013.01); *B32B 38/0012* (2013.01); *B32B 38/145* (2013.01);
(Continued)

(58) Field of Classification Search
CPC ....... A43B 23/07; A43B 13/12; A43B 13/181; A43B 23/0235; A43B 1/0009; A43B 23/0265; B32B 3/085; B32B 3/266; B32B 5/022; B32B 5/04; B32B 5/06; B32B 7/022; B32B 7/035; B32B 7/04; B32B 7/12; B32B 27/12; B32B 37/12; B32B 37/144; B32B 37/203; B32B 38/0012; B32B 38/145; B32B 38/1825; B32B 2038/0028; B32B 2038/008; D05C 9/12
See application file for complete search history.

(56) References Cited

U.S. PATENT DOCUMENTS 4,103,058 A    7/1978 Humlicek
4,349,020 A    9/1982 Krikorian
(Continued)

FOREIGN PATENT DOCUMENTS

WO    2017210160 A1    12/2017

*Primary Examiner* — Christopher W Raimund
(74) *Attorney, Agent, or Firm* — Maginot, Moore & Beck, LLP

(57) ABSTRACT

An article of footwear includes an upper formed of a base layer, a reinforcement layer, and an auxetic structure coupled to the reinforcement layer. The base layer includes an elastic material and is elastically deformable between a resting configuration and a stretched configuration. The base layer is configured to be stretched to a predetermined amount. The inelastic reinforcement layer is coupled to the base layer. The reinforcement layer is configured to delimit the stretch amount of the base layer when the base layer is in the stretched configuration.

20 Claims, 17 Drawing Sheets

(51) Int. Cl.
*B32B 3/08* (2006.01)
*B32B 7/04* (2019.01)
*B32B 7/022* (2019.01)
*B32B 27/12* (2006.01)
*B32B 7/035* (2019.01)
*B32B 3/26* (2006.01)
*B32B 7/12* (2006.01)
*B32B 5/04* (2006.01)
*B32B 5/02* (2006.01)
*B32B 5/06* (2006.01)
*D05C 9/12* (2006.01)
*B32B 37/20* (2006.01)
*B32B 37/12* (2006.01)
*B32B 38/00* (2006.01)
*B32B 37/14* (2006.01)
*B32B 38/18* (2006.01)

(52) U.S. Cl.
CPC ............ *B32B 38/1825* (2013.01); *D05C 9/12* (2013.01); *B32B 2038/008* (2013.01); *B32B 2038/0028* (2013.01)

(56) References Cited

U.S. PATENT DOCUMENTS

| | | |
|---|---|---|
| 5,882,769 A | 3/1999 | McCormack |
| 6,589,638 B1 | 7/2003 | McCormack |
| 2006/0135024 A1* | 6/2006 | Thomas .................. B32B 5/245 |
| | | 442/394 |
| 2014/0023829 A1 | 1/2014 | Broering |
| 2014/0101816 A1* | 4/2014 | Toronjo .................. A41D 31/02 |
| | | 2/69 |
| 2017/0340037 A1 | 11/2017 | Bailey et al. |

\* cited by examiner

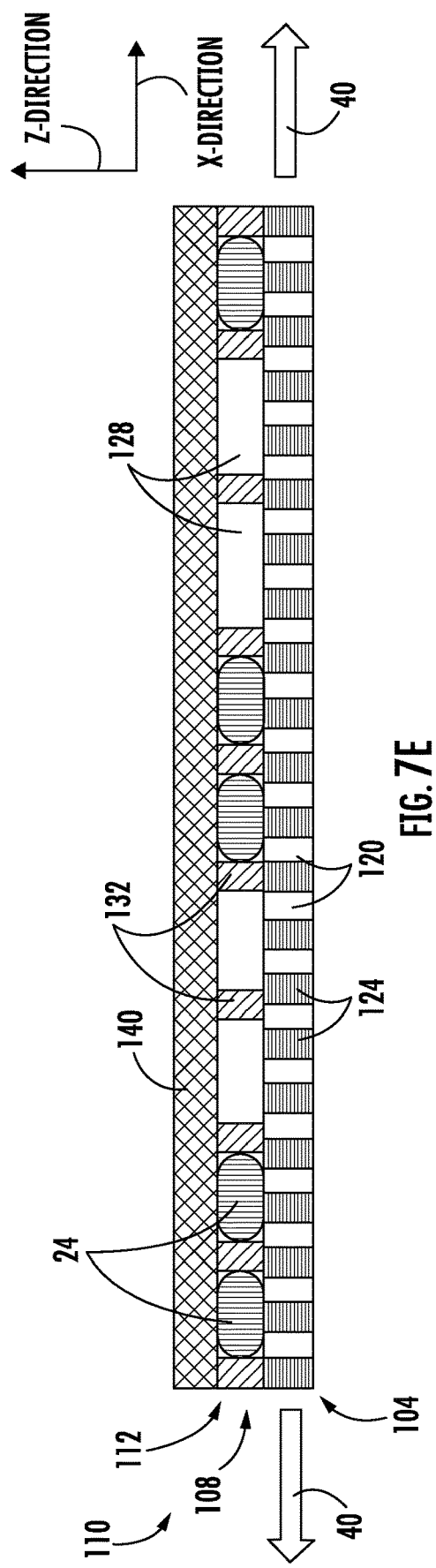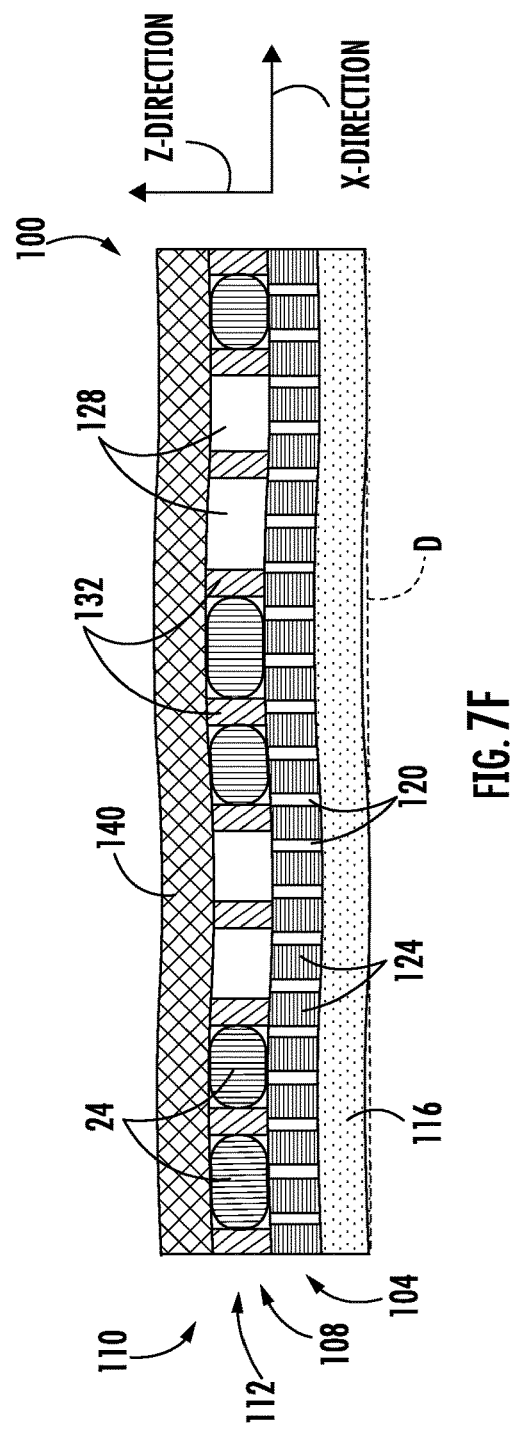

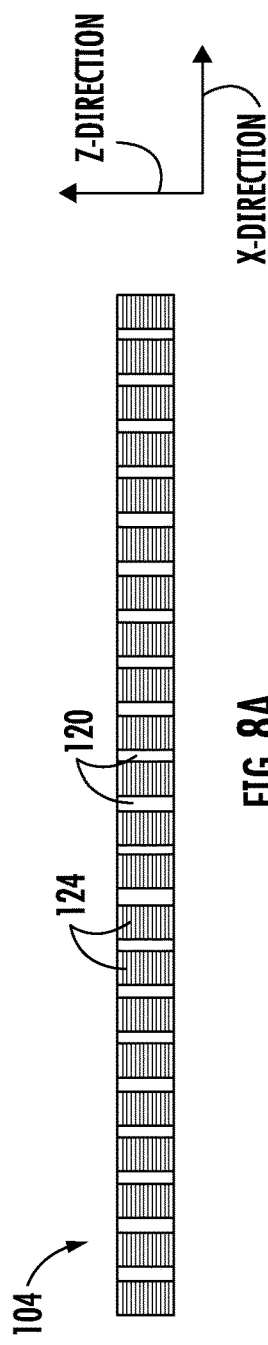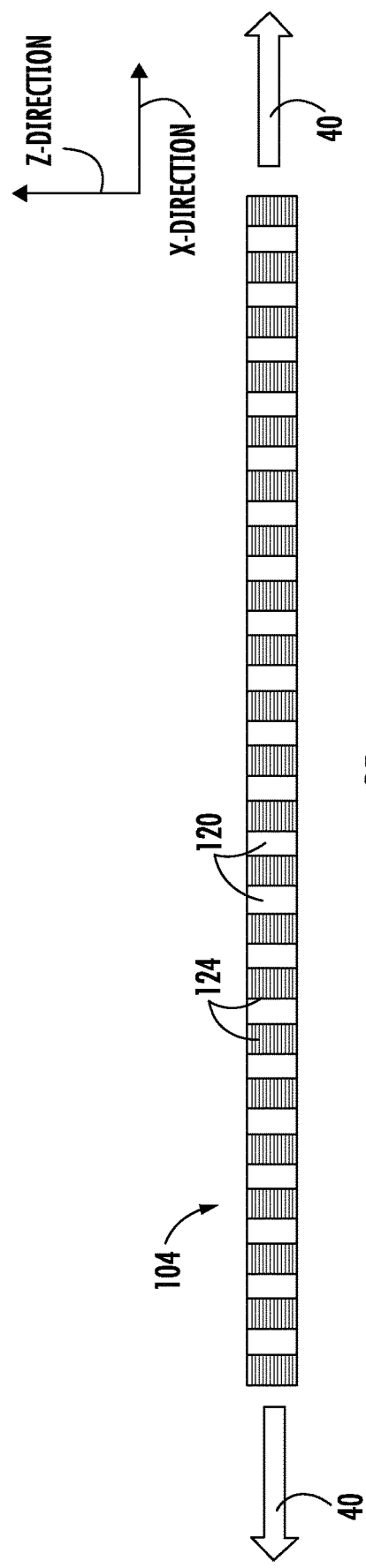

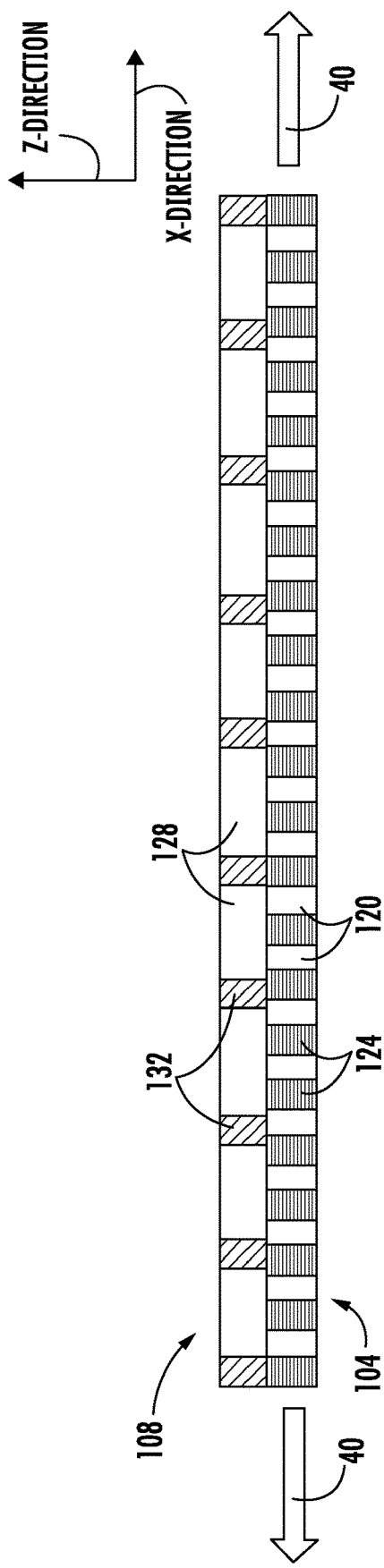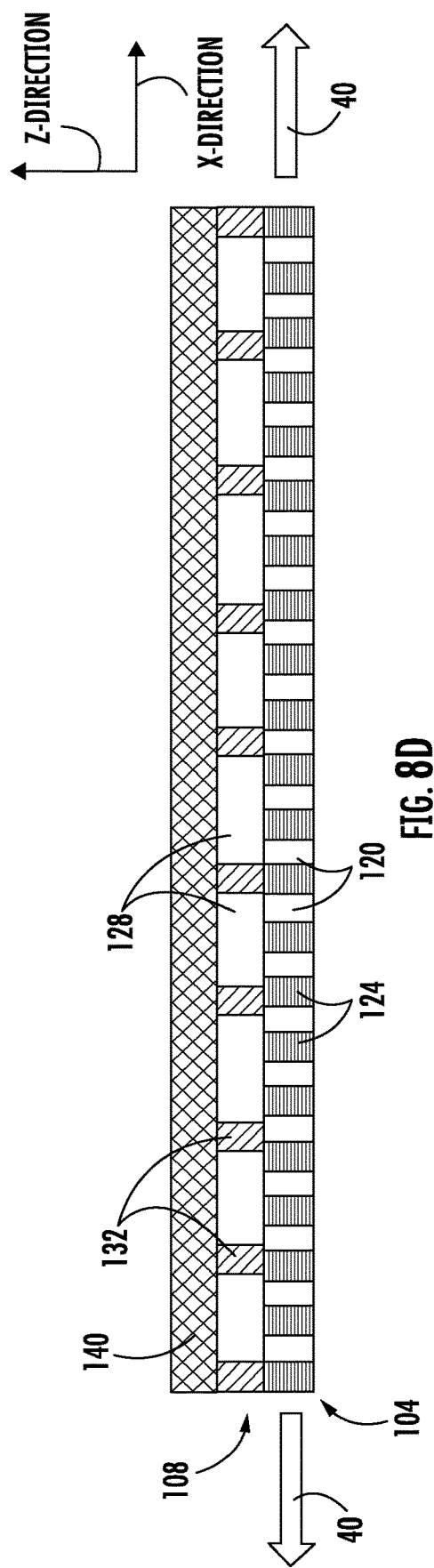

ARTICLE OF FOOTWEAR

CROSS REFERENCE TO RELATED APPLICATIONS

The present application is a nonprovisional of provisional application 62/782,423, filed 20 Dec. 2018 and entitled "Stretch Material with Lockout Feature," the disclosure of which is incorporated herein by reference in its entirety.

FIELD

This document relates to an article of footwear, and particularly to footwear including an upper with predetermined stretch properties.

BACKGROUND

Many articles of apparel are designed to fit closely to the human body. When designing an article of apparel for a close fit to the human body, different body shapes and sizes must be considered. Different individuals within a particular size will have different body shapes and sizes. For example, two individuals wearing the same shoe size may have very differently shaped feet. As another example, two individuals wearing the same shirt size may have very different chest to abdomen dimensions. In addition to accounting for different body measurements for different individuals within a size, articles of apparel designed to fit close to the human body may also need to provide sufficient strength and support for the user. For example, when fabric is used on a shoe, the fabric must be capable of supporting the foot of the wearer and limiting movement of the foot within the shoe. The need for proper support in combination with variable measurements between similarly sized individuals makes proper design of closely fitting articles of apparel difficult.

In view of the foregoing, it would be desirable to provide a garment or other article of apparel comprised of a fabric that is capable of conforming to various body shapes within a given size range. It would also be desirable to provide a fabric that is strong and capable of providing proper support to various areas on the human body. Furthermore, it would be advantageous for such fabric to be comfortable against human skin while also managing perspiration and moisture for the wearer. In addition, it would be desirable for such a garment or article of apparel to be attractive, relatively inexpensive and easy to manufacture.

SUMMARY

In accordance with one exemplary embodiment of the disclosure, there is provided an article of apparel that comprises a base layer, a reinforcement layer, and an auxetic structure. The base layer comprises an elastic material, and the base layer is elastically deformable between a resting configuration and a stretched configuration. The base layer is stretched a stretch amount when in the stretched configuration. The reinforcement layer is coupled to the base layer. The reinforcement layer is configured to delimit the stretch amount of the base layer when the base layer is in the stretched configuration. The auxetic structure is coupled to the reinforcement layer.

Pursuant to another exemplary embodiment of the disclosure, there is provided an upper for an article of footwear that comprises a base layer, a reinforcement layer, and a material. The base layer comprises an elastic material, and the base layer is elastically deformable between a resting configuration and a stretched configuration. The base layer is stretched a stretch amount when in the stretched configuration. The reinforcement layer is coupled to the base layer. The reinforcement layer is configured to delimit the amount of stretch of the base layer when the base layer is in the stretched configuration. The material is applied to the reinforcement layer. The material forms a structure defining a repeating pattern of perimeter walls and interior recesses.

In accordance with yet another exemplary embodiment of the disclosure, there is provided a method of manufacturing a panel for an article of apparel. The method includes stretching a base layer from a resting configuration to a stretched configuration. The method further includes coupling a reinforcement layer to the base layer when the base layer is in the stretched configuration. The method also includes applying an auxetic structure to the reinforcement layer when the base layer is in the stretched configuration. The auxetic structure includes a plurality of interconnected members defining a repeating pattern of voids, and each void has a reentrant shape. The method further includes releasing the base layer to allow the base layer to return to the resting configuration.

The above described features and advantages, as well as others, will become more readily apparent to those of ordinary skill in the art by reference to the following detailed description and accompanying drawings. While it would be desirable to provide an article of apparel and a method that provides one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

FIG. 7E is a diagram illustrating the panel of FIG. 1 in an embodiment of the panel formed by adhesion including the base layer of FIG. 7A in the stretched configuration.

FIG. 7F is a diagram illustrating the panel of FIG. 1 in an embodiment of the panel formed by adhesion including the base layer of FIG. 7A in a resting configuration.

FIG. 8A is a diagram illustrating the base layer of the panel of FIG. 1 in a resting configuration in an embodiment of the panel formed by stitching.

FIG. 8B is a diagram illustrating the base layer of FIG. 8A in a stretched configuration.

FIG. 8C is a diagram illustrating the base layer of FIG. 8A in the stretched configuration and the reinforcement layer of the panel of FIG. 1 in an embodiment of the panel formed by stitching.

FIG. 8D is a diagram illustrating the base layer of FIG. 8A in the stretched configuration, and the reinforcement layer and the auxetic layer of the panel of FIG. 1 in an embodiment of the panel formed by stitching.

Like numerals have been utilized to identify like components throughout the figures.

DETAILED DESCRIPTION

Figure 1:
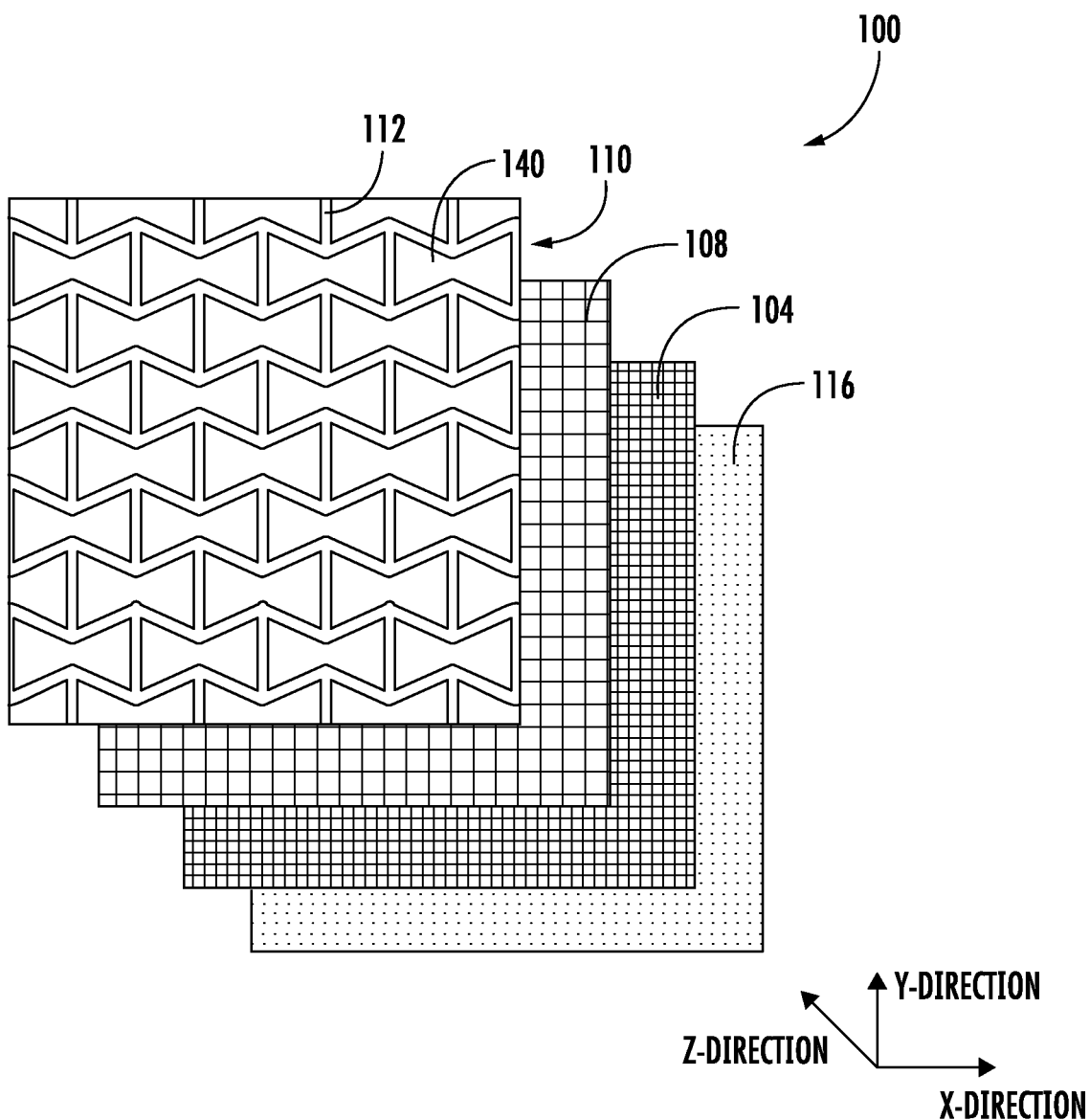
FIG. 1 is an exploded perspective view of a panel of an article of apparel including a base layer, a reinforcement layer, an auxetic layer, and a lining layer.

As for the purpose of promoting an understanding of the principles of the disclosure, reference will now be made to the embodiments illustrated in the drawings and described in the following written specification. It is understood that no limitation to the scope of the disclosure is thereby intended. It is further understood that this disclosure includes any alterations and modifications to the illustrated embodiments and includes further applications of the principles of the disclosure as would normally occur to one skilled in the art to which this disclosure pertains.

In the following detailed description, reference is made to the accompanying drawings which form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that any discussion herein regarding "one embodiment," "an embodiment," "an exemplary embodiment," and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. In particular, operations described may be performed in a different order than the described embodiments. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The terms "comprising," "including," "having," and the like, as used with respect to embodiments of the present disclosure, are synonymous.

With reference now to FIG. 1, an article of apparel includes at least one panel 100 comprising an elastic base layer 104, a reinforcement layer 108, an auxetic layer 110 including an auxetic structure 112 applied to a substrate material 140, and a lining 116 (also referred to herein as a "lining layer"). The reinforcement layer 108 is coupled to the base layer 104, the auxetic structure 112 is coupled to the reinforcement layer 108, and the lining 116 is coupled to the base layer 104 opposite the reinforcement layer 108. As described in more detail below, the panel 100 is assembled with the elastic base layer 104 in a stretched state. When the base layer 104 is released after assembly, the base layer 104 returns to a relaxed state, but the other layers 108, 112 and 116 are pulled inwardly along with the base layer 104 and experience a significant amount of buckling and folding. When the panel 100 is subsequently stretched during use, the reinforcement layer 108 limits the amount of stretch of the panel 100.

The term "article of apparel" as used herein refers to any garment, footwear or accessory configured to be worn on or carried by a human. Examples of articles of apparel include helmets, hats, caps, shirts, pants, shorts, sleeves, knee pads, elbow pads, shoes, boots, backpacks, duffel bags, cinch sacks, and straps, as well as numerous other products configured to be worn on or carried by a person.

The base layer 104 is made of an elastic material that is elastically deformable between a resting configuration and a stretched configuration. More specifically, the elastic material of the base layer 104 is deformed by stretching from a resting configuration to a stretched configuration under applied tension, also referred to as tensile stress, and returns to its original shape in the resting configuration when the applied tension is released. The elastic material of the base layer 104 has an elastic limit, beyond which the application of additional tension deforms the elastic material irreversibly. The elastic material of the base layer 104 also has an elastic modulus, which determines how much tension must be applied for the elastic material to stretch. Accordingly, the elastic modulus of the elastic material also determines how strongly the material will retract to return to its resting configuration when released from the applied tension.

In the stretched configuration, the elastic material of the base layer 104 is stretched a stretch amount, which is less than the elastic limit of the elastic material. Accordingly, when the applied tension is released from the elastic material, the base layer 104 returns to the resting configuration. Each of the elastic limit and the elastic modulus of the elastic material of the base layer 104 is high enough to enable the base layer 104 to return to the resting configuration after being stretched the stretch amount by donning, wearing, and/or using the article of apparel. Additionally, the elastic modulus of the elastic material of the base layer 104 is low enough to enable the base layer 104 to be stretched from the resting configuration during normal donning, wearing, and/or using the article of apparel.

Figure 2:
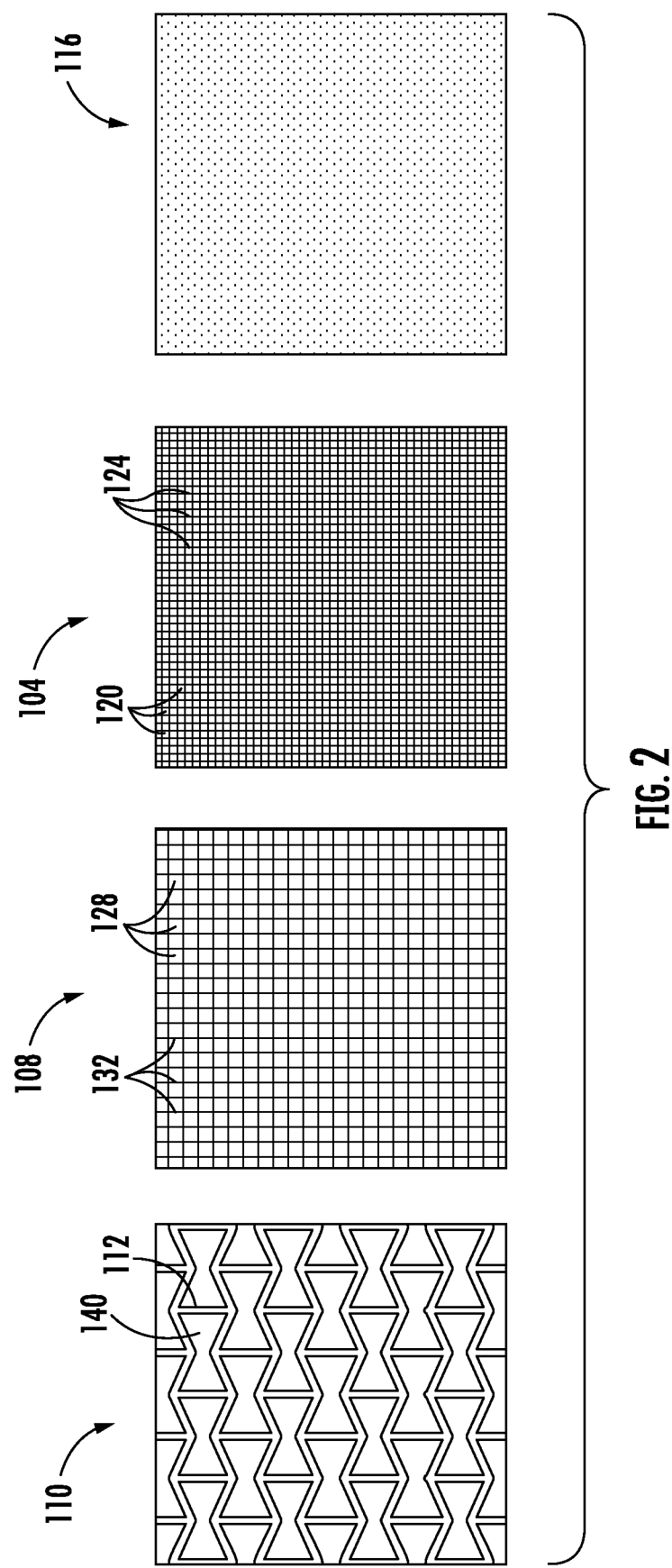
FIG. 2 is an exploded plan view of the base layer, the reinforcement layer, the auxetic layer, and the lining layer of FIG. 1.

The elastic material of the base layer 104 may be formed from any of various materials provided in any of various configurations, such as knit or woven fabrics. In the embodiment of FIG. 2, the elastic material of the base layer 104 is a fine, flexible mesh or woven fabric having a plurality of base layer openings 120 formed between a plurality of base layer threads 124. The base layer threads 124 are formed from a polymer. In at least one exemplary embodiment, the base layer threads 124 comprise polyester and elastane.

In at least one embodiment, the base layer 104 comprises a resilient material having selected stretch capabilities, e.g., four-way or two-way stretch capabilities. A material with "four-way" stretch capabilities stretches in a first direction and a second, directly-opposing direction, as well as in a third direction that is perpendicular to the first direction and a fourth direction that is directly opposite the third direction. In other words, a sheet of four-way stretch material stretches in both crosswise and lengthwise. A material with "two-way" stretch capabilities, in contrast, stretches to a substantial degree in the first direction and the second, directly opposing direction, but will not stretch in the third and fourth directions, or will only stretch to a limited degree in the third and fourth directions relative to the first and second directions (i.e., the fabric will stretch substantially less in the third and fourth directions than in the first direction and second directions). In other words, a sheet of two-way stretch material stretches either crosswise or lengthwise.

In the embodiments disclosed herein, the base layer 104 is formed of a microfiber four-way stretch fabric such as elastane fabric or other compression material including elastomeric fibers (e.g., a knitted fabric comprising greater than 50% elastane (e.g., 65% or more)). In other embodiments, the base layer 104 is comprised of an elastic fabric having limited stretch properties, such as a two-way stretch fabric.

In contrast to the elastic material of the base layer 104, the reinforcement layer 108 is made of a material that is relatively inelastic. More specifically, while the material of the reinforcement layer 108 is somewhat elastically deformable (having an elastic limit and an elastic modulus) it is inelastic in comparison to the elastic material of the base layer 104. Therefore, the material of the reinforcement layer 108 has a higher elastic modulus than the elastic material of the base layer 104, and the material of the reinforcement layer 108 does not stretch as easily as the elastic material of the base layer 104 under the same applied tension. The material of the reinforcement layer 108 also has a high elastic limit relative to the amount of stress that will be applied to the reinforcement layer 108 during normal donning, wearing, and/or using of the article of apparel. Accordingly, the material of the reinforcement layer 108 stretches very little or not at all and is unlikely to be permanently deformed or damaged under the application of normal human forces during donning, wearing and/or using the article of apparel.

As shown in FIG. 2, the material of the reinforcement layer 108 is a matrix mesh having a plurality of reinforcement layer openings 128, also referred to as apertures, formed between a plurality of reinforcement layer strands 132. The reinforcement layer strands 132 are formed from a polymer and are woven or otherwise attached together to form a square or matrix mesh, resembling a grid. It should be understood that while the reinforcement layer strands 132 have been described as being a square or matrix mesh that resembles a grid, in alternative embodiments, the reinforcement layer strands 132 can form a mesh having a different shape or arrangement. One advantage of the square mesh is that the grid shape with square openings is readily formed and retained by melting the polymer reinforcement layer strands 132 together in the desired configuration. In at least one exemplary embodiment, the reinforcement layer strands 132 comprise nylon.

As shown in FIG. 2, the reinforcement layer openings 128 are larger than the base layer openings 120 and are large enough to enable the material of the auxetic structure 112 to pass through and/or infiltrate the reinforcement layer 108 to couple the reinforcement layer 108 to the base layer 104 as described in further detail below.

In a further embodiment, the reinforcement layer is a warp knitted fabric (e.g., tricot) formed of nylon.

When the reinforcement layer 108 is coupled to the base layer 104 by stitching, by adhesion, or by another known means which retains the majority of the surface area of the reinforcement layer 108 in contact with the majority of the surface area of the base layer 104. Because the material of the reinforcement layer 108 has a higher elastic modulus than the elastic material of the base layer 104, when the reinforcement layer 108 is coupled to the base layer 104, the reinforcement layer 108 limits the stretch of the base layer 104.

The auxetic layer 110 includes the auxetic structure 112 coupled to the substrate material 140. As described in further detail below, the auxetic structure 112 is coupled or otherwise applied to the substrate material 140 in any one of a number of different manners, including, for example, printing onto the substrate material 140, adhesion to the substrate material 140, or stitching or embroidering into the substrate material 140. In any case, as described in more detail below, in the panel 100, the substrate material 140 is coupled to the reinforcement layer 108, opposite the base layer 104, by the auxetic structure 112, and the auxetic structure 112 is also coupled to the reinforcement layer 108.

The substrate material 140 is a flexible and/or resilient layer operable to permit the expansion of the auxetic structure 112 when tensile stress is applied to the panel 100. In an embodiment, the substrate material 140 comprises a resilient material having selected stretch capabilities, e.g., two-way stretch capabilities. By way of example, the substrate material 140 is formed of a nonwoven fabric. In further embodiments, the substrate is a non-stretch or low-stretch material such as a synthetic leather (e.g., 0.8 mm CLARINO™ leather available from Kururay America).

The term "auxetic" as used herein generally refers to a material or structure possessing a negative Poisson's ratio. In other words, when stretched, auxetic materials or structures expand, becoming thicker (as opposed to thinner), in a direction perpendicular to the applied force. In at least one embodiment, this expansion occurs due to inherent hinge-like configurations within the materials or structures which flex when stretched. In contrast, materials or structures with a positive Poisson's ratio contract in a direction perpendicular to the applied force. In other embodiments, the structure applied to the substrate material (stitching or adhesive as described below), while not achieving a negative Poisson's ratio, lowers the Poisson's ratio of the material (compared to a material lacking the structure).

Figure 3A:
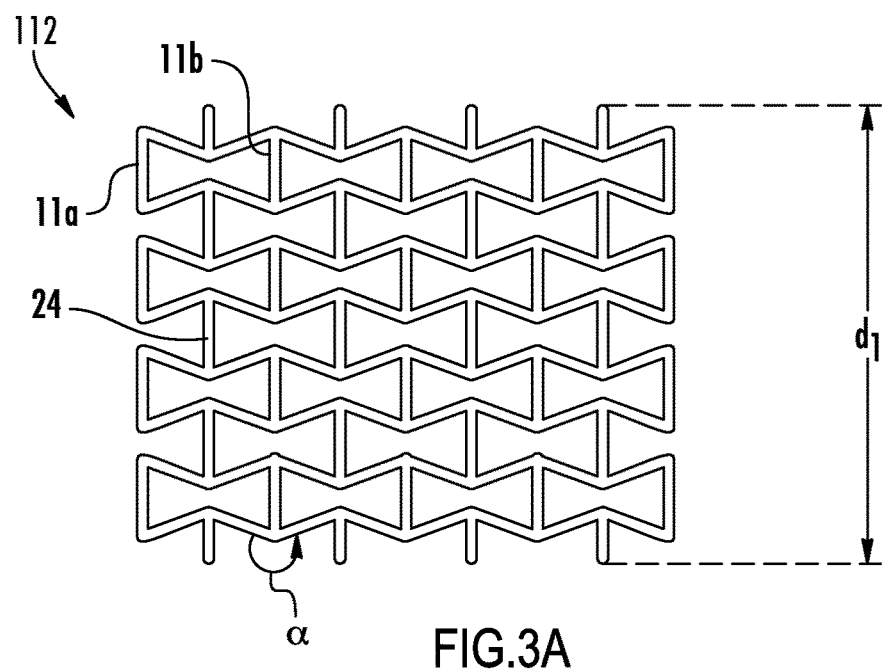
FIG. 3A is a plan view of one embodiment of an auxetic structure of the auxetic layer of FIG. 1 including segments and voids forming a plurality of reentrant shapes.
Figure 3B:
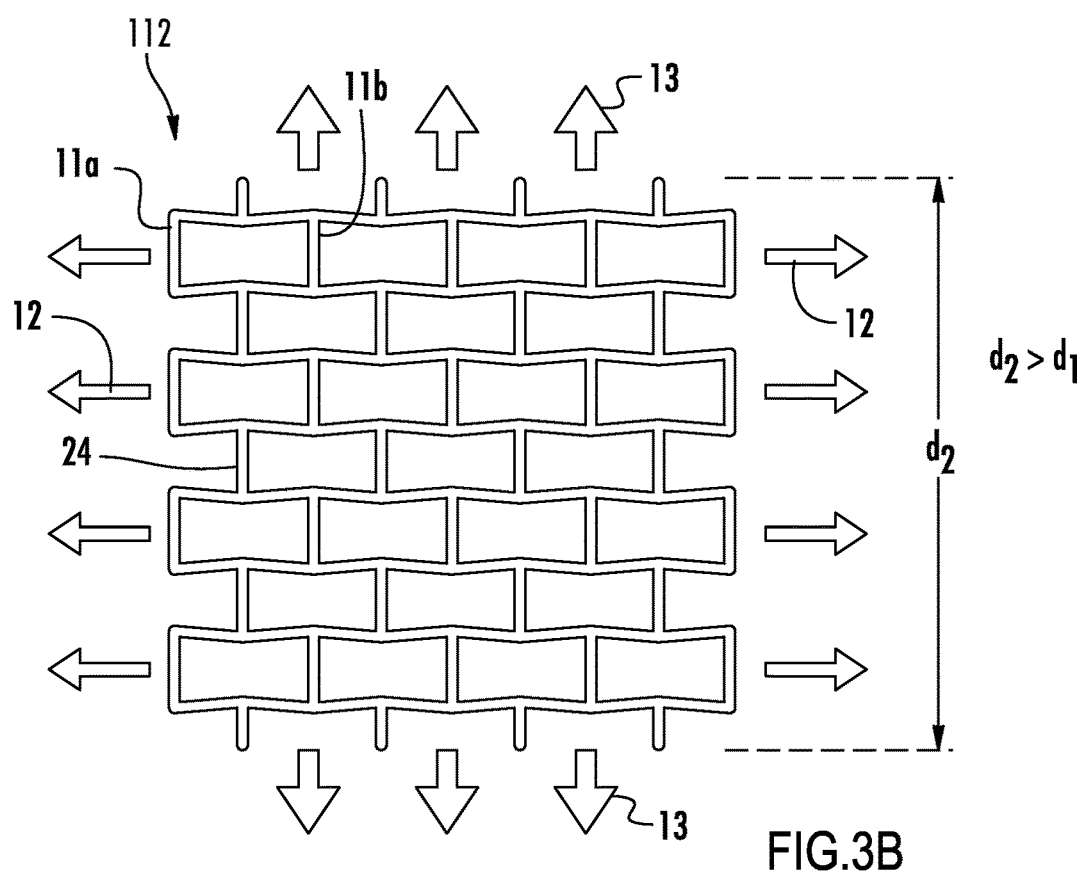
FIG. 3B is a plan view of the auxetic structure of FIG. 3A in an expanded position.

One exemplary auxetic structure 112 is shown in FIGS. 3A and 3B. The auxetic structure 112 is provided by a plurality of generally-polygon-shaped cells (e.g., hourglass or bow-tie shaped cells, which may also be referred to as "auxetic hexagons"). The cells are oriented in an array, being positioned in horizontal rows and vertical columns. FIG. 3A shows the auxetic structure 112 in its normal, unstretched state. The thickness (or width) of the auxetic structure in the unstretched state is indicated as d1. FIG. 3B shows the auxetic structure 112 stretched in the direction of arrows 12. The thickness of the auxetic structure in the stretched state is indicated by d2. As can be seen in FIG. 3B, when tension is applied along a first direction (indicated by arrows 12), the auxetic structure is stretched, expanding (becoming thicker) in a second direction perpendicular to the first direction 12 (indicated by arrows 13) such that, in the stretched state d2>d1. In the embodiment of FIGS. 3A and 3B, this phenomenon is the result of the pivoting/rotation that occurs along the vertices of the shape, i.e., where the corners of the polygons intersect.

It will be recognized that whether a structure has a negative Poisson's ratio may depend upon the degree to which the structure is stretched. Structures may have a negative Poisson's ratio up to a certain stretch threshold, but when stretched past the threshold may have a positive Poisson's ratio. For example, it is possible that when the auxetic structure 112 in FIG. 3A is stretched in the direction of arrows 12 past a threshold expansion position (e.g., past the state shown in FIG. 3B), the cells and segments of the auxetic structure 112 may be stretched to an extent that the auxetic structure 112 becomes slightly thinner (in the direction perpendicular to arrows 12) before the structure is torn apart or otherwise damaged. Accordingly, the term "auxetic" as used herein refers to structures or materials that possess or exhibit a negative (below zero) Poisson's ratio at some point during stretch. Preferably, the structure or material possesses a negative Poisson's ratio during the entirety of the stretch. The term "near auxetic," moreover, is used herein to refer to a structure having a Poisson's ratio of approximately zero and, in particular, less than +0.15 (i.e., from about 0 to +0.15).

Auxetic structures are formed from a plurality of interconnected segments forming an array of cells, and each cell having a reentrant shape. In the field of geometry, a reentrant shape may also be referred to as a "concave", or "non-convex" polygon or shape, which is a shape having an interior angle with a measure that is greater than 180°. The auxetic structure 112 in FIGS. 3A and 3B is an example of such a structure including a reentrant shape. As shown, interior angle α possesses a measurement of greater than 180°.

Auxetic structures may be defined by two different elongation directions, namely, a primary elongation direction and a secondary elongation direction. The primary elongation direction is a first direction along which the cells of the auxetic structure are generally arranged, and the secondary elongation direction is the direction perpendicular to the first direction, the cells of the auxetic structure also being arranged along this second direction. For example, in FIGS. 3A and 3B, the horizontal arrows 12 (from the viewpoint of FIG. 3B define the primary elongation direction, while vertical arrows 13 (from the viewpoint of FIG. 3B) define the secondary elongation direction. When a tension force elongates the auxetic structure 112 in the primary elongation direction, the auxetic structure is also elongated in the secondary elongation direction. Similarly, applying tension to the auxetic structure 112 in the secondary elongation direction will result in elongation in the primary elongation direction.

The total number of cells, the shape of each shell, and the overall arrangement of the cells within the structure generate the expansion pattern of the auxetic structure. That is, the arrangement and shape of the cells determine whether the auxetic structure 112 expands a greater amount in the primary elongation direction or the secondary elongation direction.

It should be noted that the phrases "primary elongation direction" and "secondary elongation direction" as used herein do not necessarily indicate that the auxetic structure 112 elongates further in one direction or the other but is merely used to indicate two general directions of elongation for the auxetic structure as defined by the cells, with one direction being perpendicular to the other. Accordingly, the term "primary elongation direction" is used merely for convenience to define one direction of stretch. However, once one direction of stretch is defined as the "primary elongation direction", the term "secondary elongation direction", as used herein, refers to a direction that is perpendicular to the primary elongation direction. For example, for auxetic structures having polygon shaped cells with two or more substantially parallel opposing edges, such as those shown in FIGS. 3A and 3B (e.g., edges 11a and 11b in FIGS. 3A and 3B), the primary elongation direction may be a line that extends perpendicularly through the substantially parallel opposing edges (e.g., edges 11a and 11b) of the cells. Thus, in the auxetic structure of FIGS. 3A and 3B, the primary elongation direction may be defined by arrows 12. However, as noted above the primary elongation direction may alternatively be defined to be the perpendicular direction defined by arrows 13. In either case, the secondary elongation direction is the direction perpendicular to the primary elongation direction.

The auxetic structure 112 is an open framework capable of supporting the substrate material 140 and directing the expansion of the substrate material 140 under applied tension. Accordingly, the auxetic structure 112, though flexible, may be stiffer than the substrate material 140 (i.e., the segments forming the auxetic structure 112 possess a higher elastic modulus than the substrate material 140). The auxetic structure 112 and the substrate material 140, in combination, are also referred to herein as the auxetic layer 110.

Figure 4A:
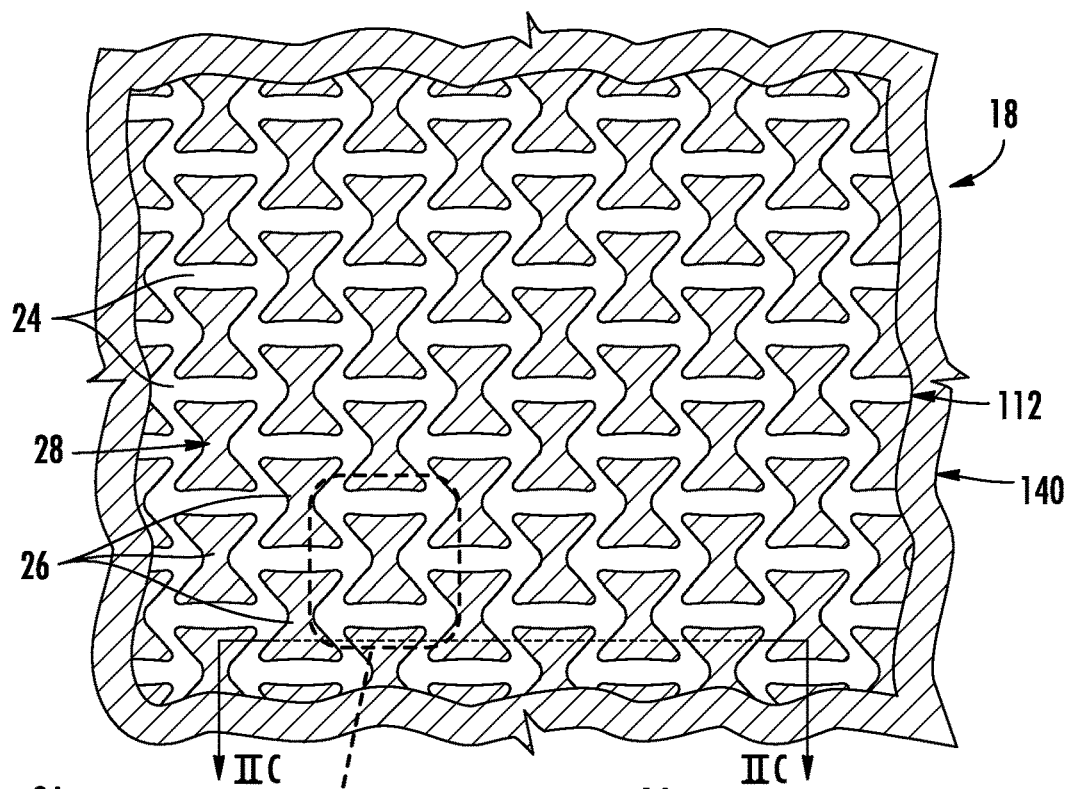
FIG. 4A is a panel of the auxetic layer including the auxetic structure of FIG. 3A applied to a substrate material.
Figure 4B:
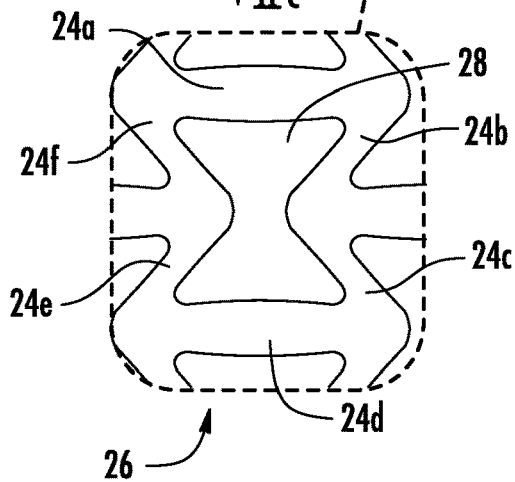
FIG. 4B is an enlarged, schematic view of the auxetic layer of FIG. 4A, showing dimensions of the auxetic layer.
Figure 4B:
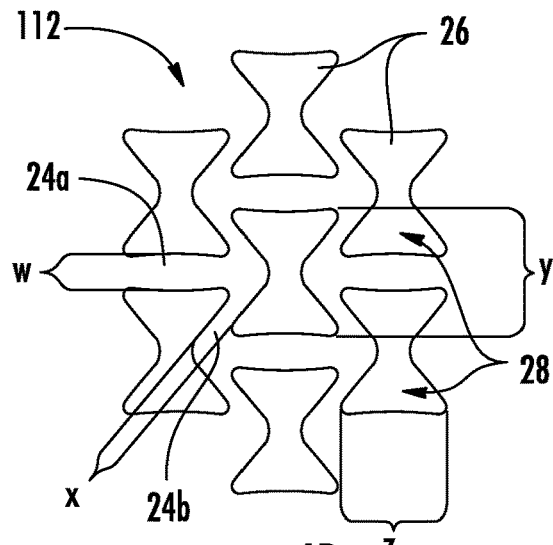
Figure 4C:
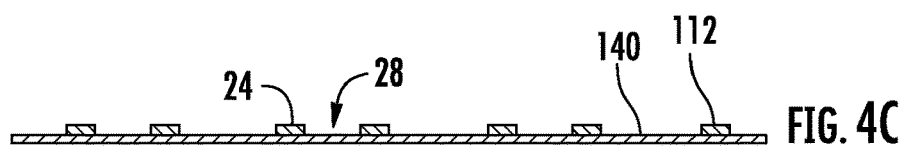
FIG. 4C is a cross-sectional view of an exemplary embodiment of the auxetic layer of FIG. 4A.

FIGS. 4A-4C show one exemplary embodiment of the auxetic structure 112 applied to the substrate material 140. As shown, the auxetic structure 112 is a plurality of segments 24 arranged to provide a repeating pattern or array of cells 26, each cell possessing a reentrant shape. Specifically, each cell 26 is defined by a set of interconnected structural members 24a, 24b, 24c, 24d, 24e, 24f, with an aperture or void 28 formed in the center of the cell 26. Such structural members may also be referred to as perimeter walls, and such voids may also be referred to as interior recesses. The void 28 exposes the substrate material 140 to which the auxetic structure 112 is coupled. Accordingly, the auxetic structure 112 is a mesh framework defined by segments 24 and voids 28.

Figure 5A:
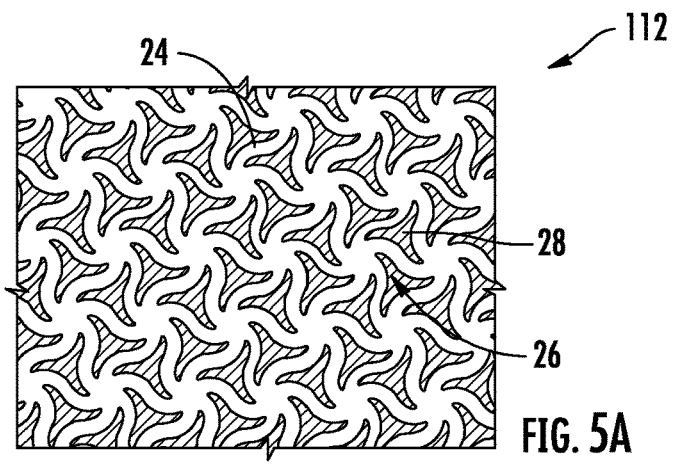
FIG. 5A is a plan view of an alternative embodiment of the auxetic structure of the auxetic layer of FIG. 1.
Figure 5B:
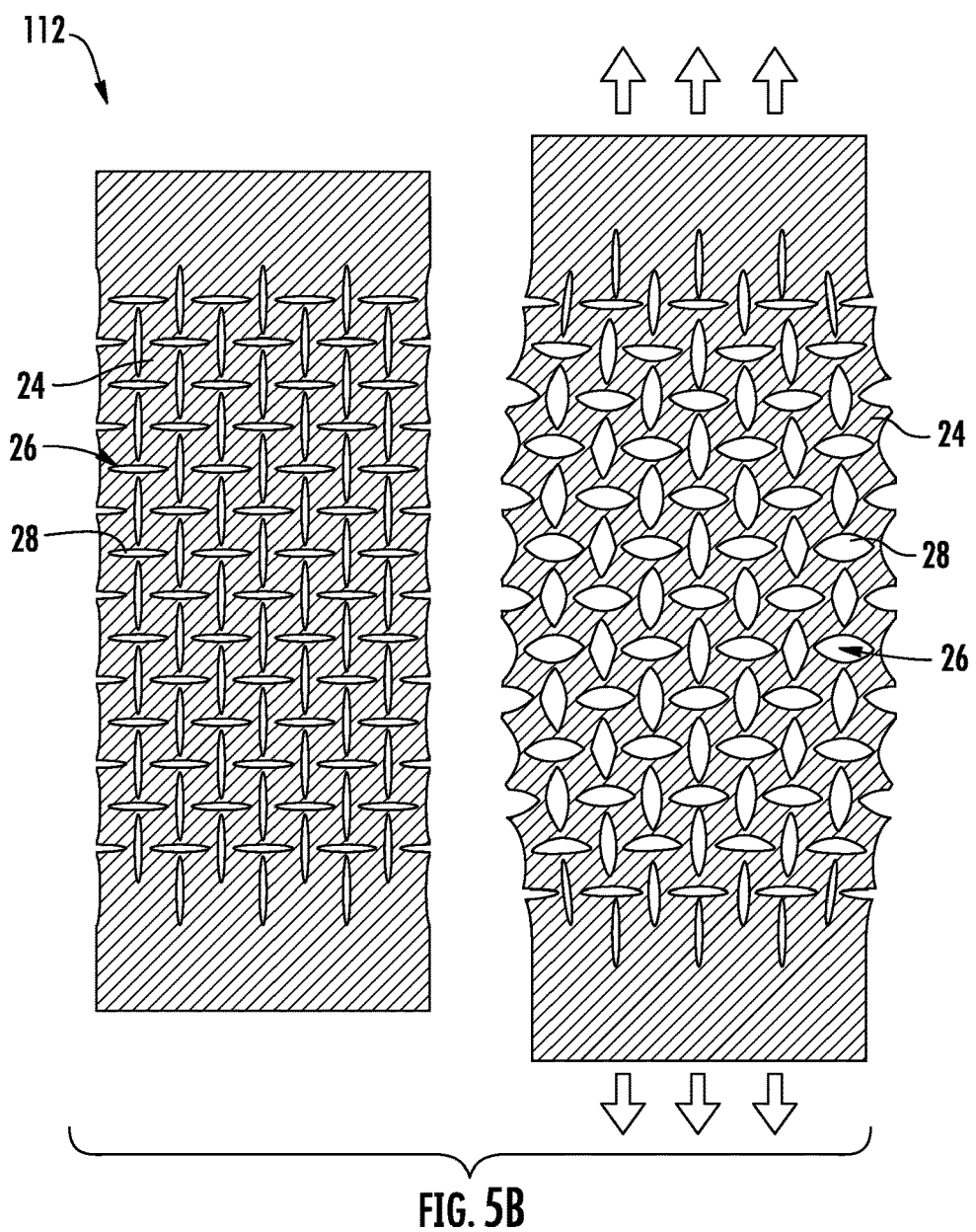
FIG. 5B is a plan view of another alternative embodiment of the auxetic structure of the auxetic layer of FIG. 1.

In at least one embodiment, the auxetic structure 112 is a unitary structure, with each cell 26 sharing segments 24 with adjacent cells. The cells 26 form an array of reentrant shapes, including a plurality of rows and columns of shapes defined by the voids 28. For example, in the embodiment of FIG. 4A, the reentrant shapes are bow-tie shapes (or auxetic hexagon shapes, similar to the shapes shown in FIGS. 3A and 3B). However, it will be recognized by those of ordinary skill in the art that the cells 26 of the auxetic structure 112 may include differently shaped segments or other structural members and differently shaped voids. FIGS. 5A and 5B show two exemplary alternative auxetic structures. In FIG. 5A, the cells 26 of the auxetic structure 112 have a twisted triangular or triangular vortex shape, and the interconnected structural members are curved segments. In FIG. 5B, the cells 26 are oval shaped, and the interconnected structural members are rectangular or square structures.

In at least one embodiment, the segments 24 possess uniform dimensions. With reference again to the exemplary embodiment of FIGS. 4A and 4B, in an embodiment, the segments 24 forming the cells 26 (i.e., the cell structural members 24a-24f) are not necessarily uniform in shape and thickness. In particular, as shown in FIG. 4B, segment 24a is slightly bowed or convex along its length while segment 24b is substantially straight along its length. Segment 24a has a width, w, of between 1mm and 5 mm, and particularly 3 mm. Segment 24b has a width, x, between 0.5 mm and 4 mm, and particularly 2 mm. While the segments 24 may vary somewhat in size and shape, the voids 28 are substantially uniform in size and shape. In the embodiment of FIG. 4B, the cell voids 28 have a height, y, between 6 and 12 mm, and particularly about 9.3 mm. The cell voids 28 have a width, z, between 6 and 12 mm, and particularly about 8.8 mm. Although not illustrated in FIG. 4B, the cross-sectional thickness of each segment 24 may be between 0.5 mm and 5 mm, and more specifically in some embodiments, between 1 mm and 2 mm, and particularly about 1.5 mm.

In order to design the auxetic layer 110 with desirable qualities, a number of design considerations must be balanced. These design considerations include, for example, the proximity of negative space (i.e., the proximity of the voids 28 associated with each cell 26), the cell size, the stroke distance (i.e., the distance a cell expands between a retracted position and a fully extended position), the mass, elasticity and strength of the material used for the cell walls. These design considerations must be carefully balanced to produce an auxetic layer 110 with the desired qualities. For example, for a given material, the larger the voids in each cell, the more flexible the resulting auxetic layer 110. Conversely, for the same material, the smaller the voids in each cell, the more rigid and resistant to expansion the resulting auxetic layer 110.

In at least one embodiment, it is desirable for the auxetic structure 112 to be more dominant than the substrate material 140 such that application of a tensile stress to the auxetic layer 110 will result in the more submissive substrate material 140 conforming to any changes in the more dominant auxetic structure 112. Accordingly, in such embodiment, the cell walls must be designed such that the resulting auxetic structure 112 will be more dominant than the material of the substrate material 140. Selection of the substrate material 140 relative to the auxetic structure 112 permits the control of the auxetic layer stretch pattern and/or the auxetic structure stretch pattern (discussed in greater detail below).

It should be understood that, while the substrate material 140 has been described as being formed of a stretch fabric, in other embodiments, the substrate material 140 may be comprised of other resilient materials, including any of various elastomers such as thermoplastic polyurethane (TPU), nylon, or silicone (e.g., a plastic sheet formed of resilient plastic). Furthermore, when the substrate material 140 is comprised of an elastomer, the substrate material 140 may be integrally formed with the auxetic structure 112 to provide a continuous sheet of material that is seamless and without constituent parts.

With various configurations of the auxetic structure 112 and the substrate material 140, then, it is possible to control the overall stretch/expansion pattern of the auxetic layer 110 by combining the individual properties of the auxetic structure 112 and the substrate material 140. By way of example, it is possible to provide a non-auxetic layer with auxetic properties. In an embodiment, the substrate material 140 is four-way stretch material that, by itself, is not auxetic (i.e., it exhibits a positive Poisson's ratio under load). Accordingly, when the substrate material 140 is separate from the auxetic structure 112 and tension is applied across the auxetic layer material, the auxetic layer material contracts in the direction perpendicular to the applied tension. Superimposing the auxetic structure 112 over the substrate material 140, however, provides a framework sufficient to drive the expansion pattern of the substrate material 140. As a result, the substrate material 140 in combination with the auxetic structure 112 will follow the expansion pattern of the auxetic structure 112, expanding not only along the axis of the applied tensile strain, but also along the axis perpendicular to the axis of the applied tensile strain. The resiliency of the substrate material 140, moreover, optimizes the contouring ability of the auxetic layer 110 since it tightly conforms to the surface of the wearer. Furthermore, the substrate material 140, being resilient, limits the expansion of the auxetic layer 110 to that necessary to conform to the object. That is, the substrate material 140, while permitting expansion of the auxetic structure 112, will draw the arrangement back towards its normal/static position. Accordingly, over expansion of the auxetic structure 112 is avoided.

Additionally, it is possible to limit the auxetic properties of the auxetic layer 110 by selecting an appropriate substrate material 140. When forming apparel (e.g., footwear), while expansion is desired, it is often desirable to limit the degree of expansion along one or more axes. By selecting a substrate material 140 of two-way stretch material, it is possible to limit the expansion along a selected axis. Specifically, mounting an auxetic structure 112 onto a substrate material 140 formed of two-way stretch material permits the expansion of the auxetic layer 110 along an axis parallel to the two-way stretch direction of the substrate material 140, but limits expansion of the auxetic layer 110 along an axis perpendicular to the two-way stretch direction of the substrate material 140. Accordingly, application of a tensile stress along the two-way stretch direction of the substrate material 140 results in significant expansion of the auxetic layer 110 along the two-way stretch direction, but only limited or no expansion of the auxetic layer 110 along the axis perpendicular to the two-way stretch direction. Application of a tensile stress along the axis perpendicular to the two-way stretch direction results in limited or no expansion of the auxetic layer 110 in either direction. In this manner, an article of apparel may possess a customized stretch direction, including a plurality of auxetic structures 112 and auxetic layers 140 selected and positioned to provide optimum stretch properties to the apparel.

Thus, in embodiments where the substrate material 140 has two-way or four-way stretch properties, the orientation of the substrate material 140 relative to the auxetic structure 112 may influence the overall stretch properties of the auxetic layer 110. For example, consider a panel 100 with a substrate material 140 having two-way stretch properties configured such that the two-way stretch direction of the substrate material 140 is aligned with a stretch direction of the auxetic structure 112 (e.g., the two-way stretch direction of the substrate material 140 is aligned with the arrows 12 shown on the auxetic structure 112 in the embodiment of FIG. 3B). The Poisson's ratio exhibited by this panel 100 may tend to be closer to zero, or "near zero", than would be exhibited by a panel 100 including a substrate material 140 with four-way stretch properties. Because the substrate material 140 limits stretch in the perpendicular direction (e.g., in the direction of arrows 13 in FIG. 3B), the stretch of the panel 100 will be limited in this perpendicular direction, thus keeping the Poisson's ratio for the panel closer to zero.

Finally, the auxetic layer 110 forms a more supportive structure than either the auxetic structure 112 or the substrate material 140 alone. That is, the auxetic layer 110 described above provides an open framework that functions as a support structure for the article of apparel. For example, when used to form an upper in an article of footwear, the auxetic layer 110 may be generally self-supporting.

As shown in FIG. 1, the lining layer 116 is coupled to the base layer 104 opposite the reinforcement layer 108. Like the reinforcement layer 108, the lining layer 116 is made of a material that is relatively inelastic. More specifically, the material of the lining layer 116 is inelastic in comparison to the elastic material of the base layer 104. Therefore, the material of the lining layer 116 has a higher elastic modulus than the elastic material of the base layer 104, and the material of the lining layer 116 does not stretch as easily as the elastic material of the base layer 104 under the same applied tension. The material of the lining layer 116 also has a high elastic limit relative to the amount of stress that will be applied to the reinforcement layer 108 during normal donning, wearing, and/or using of the article of apparel. Accordingly, the material of the lining layer 116 stretches very little to none and is unlikely to be permanently deformed or damaged under the application of normal human forces during donning, wearing and/or using the article of apparel.

In various embodiments, the lining layer 116 is a knit fabric of nylon or polyester yarns. In embodiments where the panel 100 is used in an upper of an article of footwear, the lining layer 116 is made of a material that has a high puncture resistance. For example, in such embodiments, the lining layer 116 is puncture resistant under forces above 450 Newtons. Such puncture resistance is particularly advantageous in cleated sports, such as baseball, football, and soccer, to protect the integrity of the article of footwear, as well as the user's foot therein, in the event of contact with the cleats of another article of footwear. In alternative embodiments, the lining layer 116 is puncture resistant under forces other than those above 450 Newtons.

The lining layer 116 is the innermost layer of the panel 100. Accordingly, when the panel 100 is integrated into an article of apparel, the lining layer 116 faces inwardly toward itself and/or toward the body of a wearer or user of the article of apparel. Thus, the material of the lining layer 116 is typically also a material that is comfortable in contact with the skin of a wearer or user. In some alternative embodiments, the panel 100 does not require the lining layer 116. In such embodiments, the base layer 104 is the innermost layer of the panel 100.

Figure 6:
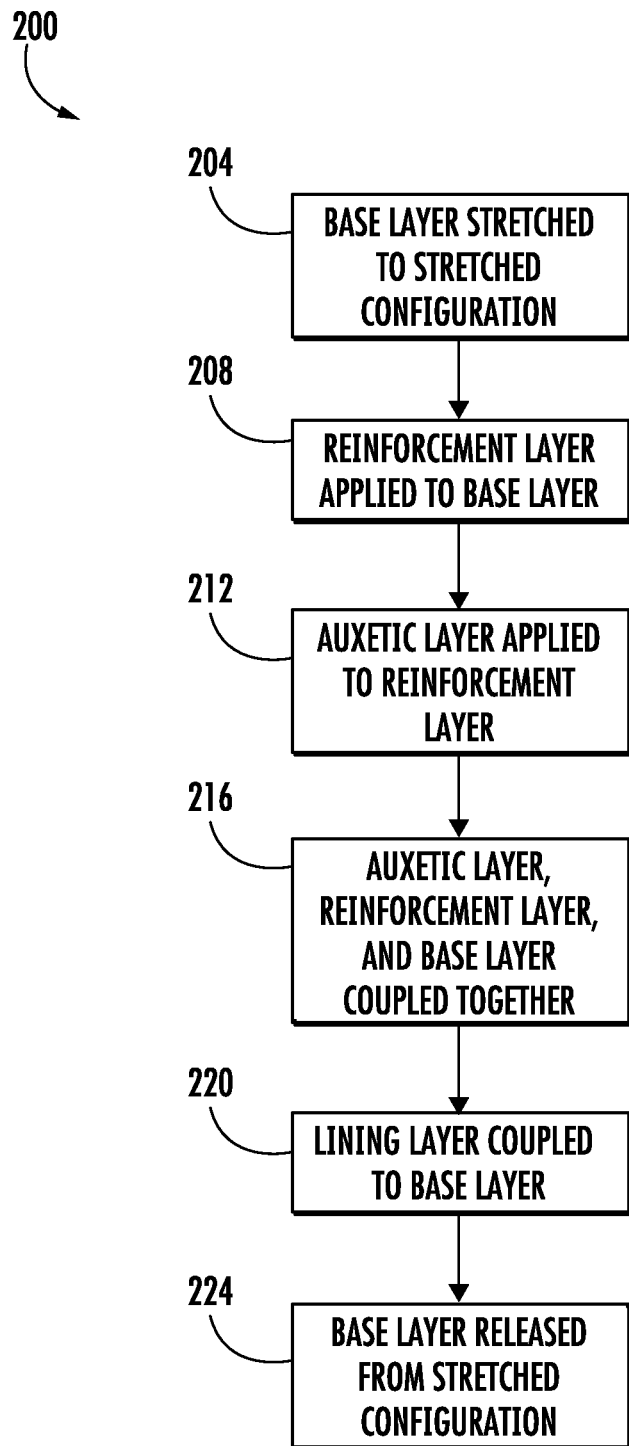
FIG. 6 is a flowchart illustrating a method of making the panel of the article of apparel of FIG. 1.

As shown in FIG. 6, the panel 100 is formed by combining the layers described above. More specifically, FIG. 6 depicts a method 200 for forming the panel 100. First, the base layer is stretched from the resting configuration to the stretched configuration (block 204). Then, the reinforcement layer is applied to the base layer, while the base layer is still in the stretched configuration (block 208). Next, the auxetic layer is applied to the reinforcement layer on the opposite side of the reinforcement layer as the base layer (block 212). The base layer is still in the stretched configuration for the application of the reinforcement layer. The auxetic layer, the reinforcement layer, and the base layer are all coupled together to form a unitary structure (block 216) while the base layer is in the stretched configuration. In at least one embodiment, the lining layer is also coupled to the base layer on the opposite side of the base layer as the reinforcement layer and the auxetic layer while the base layer is in the stretched configuration (block 220). Finally, the base layer is released from the stretched configuration and returns to the resting configuration (block 224). Due to the cooperation between the auxetic structure of the auxetic layer and the stretch properties of the base layer in the panel, when the base layer returns to the resting configuration, the panel buckles or puckers. Specific embodiments of the methods for combining the layers of the panel are described in more detail below.

In some embodiments, the panel 100 is formed according to the general method 200 above by adhesion. More specifically, in such embodiments, the auxetic structure 112 is formed on the substrate material 140 by adhesion, and the auxetic layer 110 is coupled to the reinforcement layer 108 and the base layer 104 by adhesion.

In embodiments where the panel 100 is formed by adhesion, the auxetic structure 112 is made of a thermoplastic adhesive material that is applied to the resilient fabric material of the substrate material 140. Accordingly, the material forming the segments 24 of the auxetic structure 112 is an adhesive that is activated when heated above a predefined temperature, binds to components that it contacts while heated, and then resists separation from those components when cooled below the predefined temperature.

For example, the segments 24 of the auxetic structure 112 can be comprised of a polymer such as ethylene-vinyl acetate (EVA), a thermoplastic such as nylon, or a thermoplastic elastomer such as polyurethane. Each of these materials possesses elastomeric qualities of softness and flexibility. In another exemplary embodiment, the segments 24 are comprised of a thermoplastic foam, such as a thermoplastic polyurethane (TPU) foam or an EVA foam, each of which is resilient and provides a cushioning effect when compressed. While EVA and TPU foam are disclosed herein as exemplary embodiments of the auxetic structure 112, it will be recognized by those of ordinary skill in the art that the auxetic structure 112 may alternatively be comprised of any of various other thermoplastic adhesive materials. For example, in other alternative embodiments, the auxetic layer may be comprised of polypropylene, polyethylene, XRD foam (e.g., the foam manufactured by the Rogers Corporation under the name PORON®), or any of various other polymer materials exhibiting sufficient flexibility and elastomeric qualities as well as appropriate thermoplastic and adhesive properties. In a further embodiment, the foam forming the auxetic layer is auxetic foam. In at least one alternative embodiment, the auxetic structure 112 can be made of a glue.

The segments 24 of the auxetic structure 112 may be formed on the substrate material 140 in any of various methods. By way of example, the auxetic structure 112 is formed on the substrate material 140 via a molding process such as compression molding or injection molding. By way of further example, the auxetic structure 112 is formed on the substrate material 140 via an additive manufacturing process such as selective laser sintering (SLS). In SLS, lasers (e.g., $CO_2$ lasers) fuse successive layers of powdered material to form a three-dimensional structure. Once formed, the auxetic structure 112 is coupled (e.g., attached, mounted, or adhered) to the substrate material 140. Specifically, the auxetic structure 112 may be connected to the substrate material 140 using any of various connection methods (examples of which are described in further detail below).

In at least one embodiment, the auxetic structure 112 is printed directly on to the substrate material 140 using any of various printing methods, as will be recognized by those of ordinary skill in the art. Alternatively, the auxetic structure 112 may first be printed on a transfer sheet, and then a heat transfer method may be used to transfer the auxetic structure 112 to the substrate material 140.

FIGS. 7A-7G provide a schematic illustration of an embodiment wherein the panel 100 is formed by adhesion. As described in further detail below, the auxetic structure 112 is applied to the substrate material 140 via adhesion, the auxetic structure 112 is also coupled to the reinforcement layer 108 by adhesion, the auxetic structure 112 is coupled to the base layer 104 by adhesion, and the substrate material 140 is coupled to the reinforcement layer 108 by the adhesion of the auxetic structure 112 to the reinforcement layer 108 and the base layer 104.

Figure 7A:
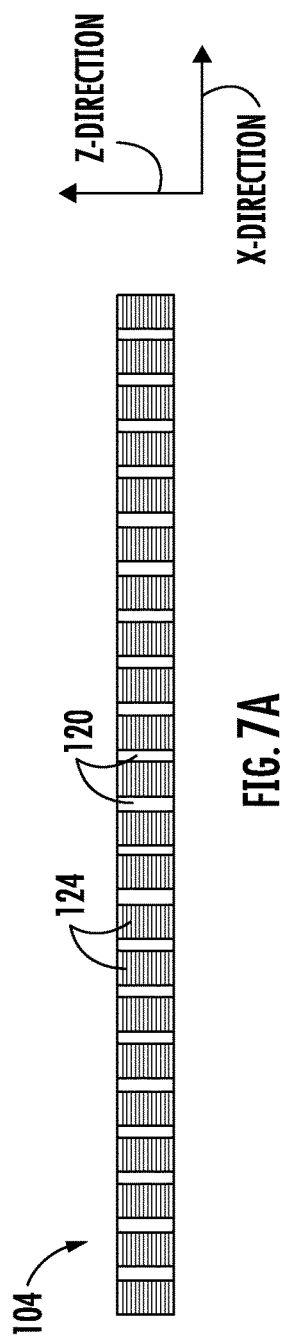
FIG. 7A is a diagram illustrating the base layer of the panel of FIG. 1 in a resting configuration in an embodiment of the panel formed by adhesion.
Figure 7B:
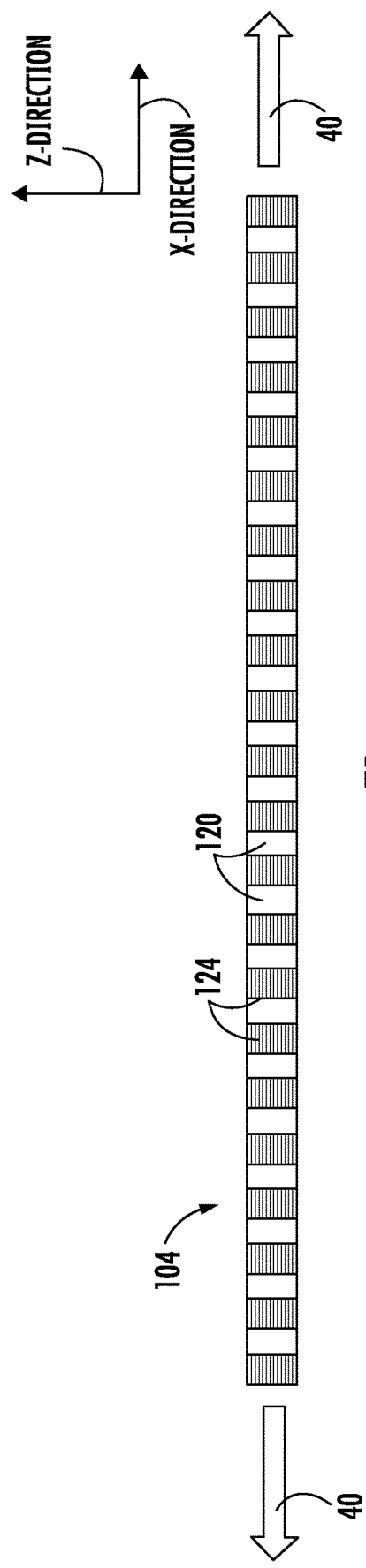
FIG. 7B is a diagram illustrating the base layer of FIG. 7A in a stretched configuration.

As described in the method 200 in association with block 204, forming the panel 100 includes first stretching the base layer 104 from the resting configuration (shown in FIG. 7A) into the stretched configuration (shown in FIG. 7B) by applying tension in the direction of the arrows 40. As discussed above, the base layer 104 can be stretched in either or both of the x-direction and the y-direction. By way of example, in FIGS. 7B-7E the arrows 40 are aligned along the x-direction of the material of the base layer 104. Additionally, the threads 124 of the base layer 104 are shown in a vertical configuration in FIGS. 7A-7G merely for the purpose of illustrating the locations of the threads 124 and that there are openings 120 between the threads 124. The illustrations shown in FIGS. 7A-7G are schematic representations only, and are not to scale. As shown in FIGS. 7A and 7B, stretching the base layer 104 into the stretched configuration elongates the base layer threads 124 and enlarges the base layer openings 120 (or increases the distance between each of the base layer threads 124) relative to the resting configuration.

Figure 7C:
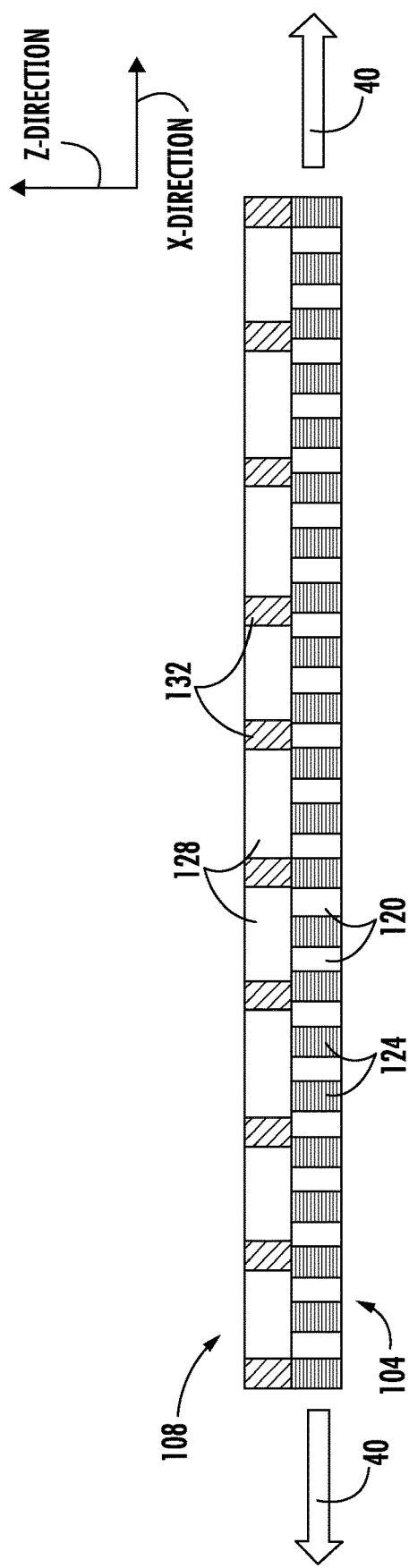
FIG. 7C is a diagram illustrating the base layer of FIG. 7A in the stretched configuration and the reinforcement layer of the panel of FIG. 1 in an embodiment of the panel formed by adhesion.

As shown in FIG. 7C (and described above in association with block 208 of method 200), the reinforcement layer 108 is then applied or coupled to the base layer 104, while the base layer 104 is held in the stretched configuration. By way of example, the reinforcement layer 108 is a sheet bonded or otherwise directly connected to a stretch fabric base layer 104 such that the two layers 108 and 104 function as a unitary structure. To this end, the reinforcement layer 108 may be connected to the base layer 104 via adhesives, molding, welding, sintering, stitching or any of various other means. In an embodiment, the reinforcement layer 108 is brought into contact with the base layer 104 and then heat is applied to place the material forming the reinforcement layer in a semi-liquid (partially melted) state such that material of the reinforcement layer in contact with the base layer infiltrates the base layer fabric. Alternatively, the reinforcement layer is applied in a molten or semi-molten state. In either application, once cooled, the reinforcement layer 108 is securely fixed (permanently connected) to the fibers 124 of the base layer 104 such that any movement of the base layer 104 is transferred to the reinforcement layer 108, and vice versa.

Figure 7D:
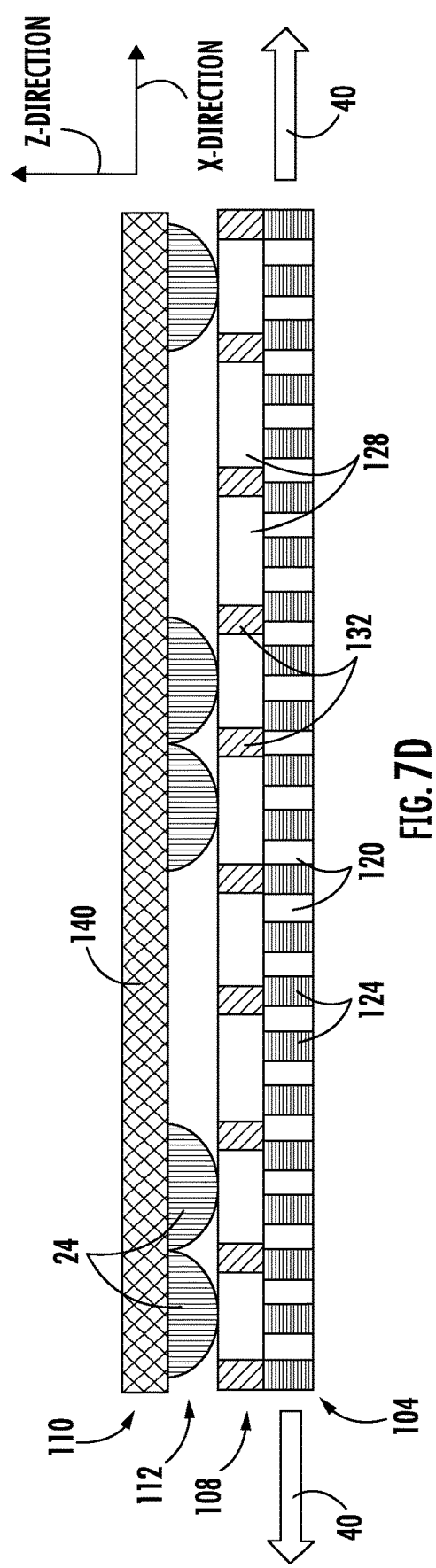
FIG. 7D is a diagram illustrating the base layer of FIG. 7A in the stretched configuration, and the reinforcement layer and the auxetic layer of the panel of FIG. 1 in an embodiment of the panel formed by adhesion.

As shown in FIG. 7D (and described above in association with block 212 of method 200), the auxetic structure 112, which is coupled to the substrate material 140 by adhesion, is arranged on the reinforcement layer 108 opposite the base layer 104. The auxetic structure 112 is arranged on the reinforcement layer 108 while the base layer 104 is still in the stretched configuration. As described above, the segments 24 of the auxetic structure 112 are arranged in an auxetic pattern on a first side of the substrate material 140. As shown in FIG. 7D, the first side of the substrate material 140 is arranged on the reinforcement layer 108. Accordingly, the auxetic structure 112 is arranged on the reinforcement layer 108 in this same auxetic pattern. As such, the segments 24 of the auxetic structure 112 do not cover the entirety of the reinforcement layer 108.

As shown in FIG. 7E (and described above in association with block 216 of method 200), heat is subsequently applied to the auxetic structure 112, either directly or by heating at least one of the substrate material 140, the reinforcement layer 108, and the base layer 104. Heating the auxetic structure 112 melts the thermoplastic material of the segments 24 (shown in FIGS. 3A-5B) of the auxetic structure 112 such that the thermoplastic material comes into contact with some of the reinforcement layer strands 132. Additionally, the melted thermoplastic material at least partially fills the some of the relatively large reinforcement layer openings 128 such that the material passes through those reinforcement layer openings 128 and also comes into contact with some of the base layer threads 124. Accordingly, the thermoplastic material of the segments 24 of the auxetic structure 112 is simultaneously in contact with the substrate material 140, the reinforcement layer 108, and the base layer 104.

The material of the segments 24 binds to the reinforcement layer strands 132 and the base layer threads 124 that it comes in contact with while heated, and then resists separation from the reinforcement layer 108 and the base layer 104 when cooled below the predefined temperature. Put another way, the auxetic structure 112 is fused into the reinforcement layer 108 and the base layer 104. The auxetic structure 112 is coupled to the reinforcement layer 108 and the base layer 104 while the base layer 104 is still in the stretched configuration.

As shown in FIG. 7F (and described above in association with block 220 of method 200), after the auxetic structure 112 is coupled to the reinforcement layer 108 and the base layer 104, the lining layer 116 is applied to the base layer 104 opposite the reinforcement layer 108. As mentioned above, in some alternative embodiments, the lining layer 116 is not included in the panel 100. In embodiments where the panel 100 includes a lining layer 116, the lining layer 116 is coupled (e.g., mounted, attached, or fixed) to the base layer 104 by way of example, as an elastomer sheet bonded or otherwise directly connected to a stretch fabric base layer 104 such that the two layers 116 and 104 function as a unitary structure. To this end, the lining layer 116 may be connected to the base layer 104 via adhesives, molding, welding, sintering, stitching or any of various other means. In an embodiment, the lining layer 116 is brought into contact with the base layer 104 and then heat is applied to place the material forming the lining layer in a semi-liquid (partially melted) state such that material of the lining layer in contact with the base layer infiltrates the base layer fabric. Alternatively, the lining layer is applied in a molten or semi-molten state. In either application, once cooled, the lining layer 116 is securely fixed (permanently connected) to the fibers 124 of the base layer 104 such that any movement of the base layer 104 is transferred to the lining layer 116, and vice versa.

The applied tension is then released from the base layer 104 to enable the base layer 104 to return to the resting configuration (as described above in association with block 224 of method 200). Because the base layer 104 is coupled to the auxetic structure 112 by the segments 24, when the material of the base layer 104 contracts to return to the resting configuration. As a result of the contraction of the base layer 104, the auxetic structure contracts inwardly, and the panel 100 puckers or buckles (which puckering or buckling of the panel 100 and its various layers may be referred to herein as a "puckered configuration"). Depending on the strength of the auxetic structure, the puckering and buckling may occur between the segments of the auxetic structure 112 and/or along the segments 24 of the auxetic structure 112.

As illustrated by the dashed line D in FIG. 7F (where D lies in the x-y plane), this puckering or buckling raises and/or lowers the panel 100, including the substrate material 140, the auxetic structure 112, the reinforcement layer 108, the base layer 104, and the lining layer 116 in the z-direction. Accordingly, when in the puckered configuration, the panel 100 and one or more of its constituent layers are provided with peaks, valleys and other surface irregularities in the z-direction. Put another way, the puckering or buckling does not change the thickness of the panel 100 or of the layers of the panel 100 but forms a textured surface on the panel 100 wherein the layers of the panel 100 have additional dimensions in the z-direction.

Providing the panel 100 with surface irregularities in the z-direction when the base layer 104 is in the resting configuration (and the panel 100 is in the puckered configuration) provides material in the panel 100 that is available to flatten out when the panel 100 is stretched in the x-direction and/or the y-direction and therefore better accommodates stretching of the article of apparel during wearing and/or use. Accordingly, the material of the lining layer 116 and the material of the reinforcement layer 108, each of which has a relatively high modulus of elasticity, are not required to stretch under the forces applied during normal donning, wearing, and/or using the article of apparel, but instead flatten in the z-direction as the base layer 104 stretches in the x-direction and/or y-direction under the forces applied during normal donning, wearing, and/or using the article of apparel. Additionally, the reinforcement layer 108, which has a relatively high modulus of elasticity, limits the stretch of the panel 100 in the x-direction and/or the y-direction.

Figure 7G:
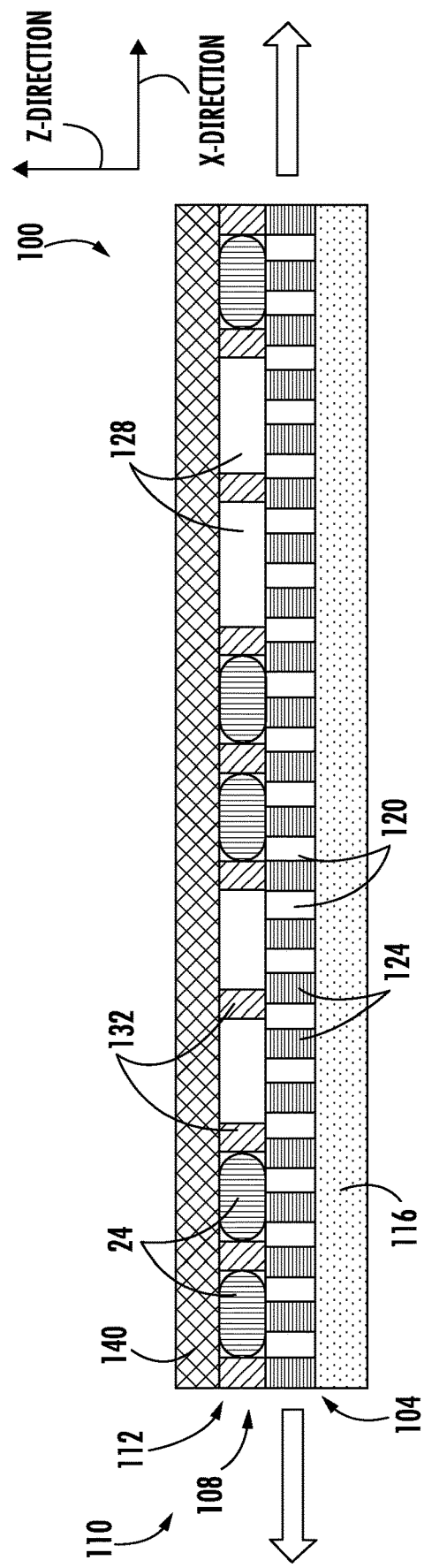
FIG. 7G is a diagram illustrating the panel of FIG. 1 in a stretched configuration.

As shown in FIG. 7G, when the panel 100 is subsequently stretched under applied tension during normal donning, wearing, and/or use of the article of apparel, the relative inelasticity of the material of the reinforcement layer 108 prevents stretching the panel 100 beyond the arrangement of the reinforcement layer 108 when the reinforcement layer 108 is originally applied to the base layer 104. In other words, the reinforcement layer 108 is in a resting configuration when it is applied to the base layer 104, which is in the stretched configuration. When the base layer 104 contracts back to its resting configuration, the reinforcement layer 108 is in a contracted configuration (shown in FIG. 7F). The reinforcement layer 108 thus limits the stretch of the panel 100 back to the resting configuration of the reinforcement layer 108. This limitation of the amount of stretch of the panel 100 by the reinforcement layer 108 is also referred to as "lockout."

Accordingly, the panel 100 is configured to stretch in the x-direction and/or the y-direction by stretching the base layer 104 in the x-direction and the y-direction. The auxetic shape of the panel 100 provided by the auxetic structure 112 enables the substrate material 140, the auxetic structure 112, the reinforcement layer 108, and the lining layer 116 to accommodate the stretch of the base layer 104 in the x-direction and/or the y-direction by flattening or rising in the z-direction. However, to protect the integrity of the panel 100 and prevent damage, the reinforcement layer 108 limits (or "locks out") the stretch of the panel 100 in the x-direction and/or the y-direction. Accordingly, the reinforcement layer 108 provides structural reinforcement and rigidity to the panel 100 while still accommodating the desired stretch in the x-direction and/or the y-direction.

When the base layer 104 is in the resting configuration, the surface irregularities of the panel 100 in the z-direction lifts some of the lining layer 116 away from the body of the wearer or user. In other words, less surface area of the panel 100 is in contact with the body of the wearer or user, which improves the fit as well as moisture wicking capabilities of the article of apparel.

Moreover, because the auxetic structure 112 is integrated into the panel 100 in this manner, the stretch of the base layer 104, the reinforcement layer 108, and the panel 100 as a whole are guided by the auxetic structure 112 in the manner described above with respect to the substrate material 140.

While the embodiment described above includes the auxetic structure 112 formed as an adhesive material that infiltrates the reinforcement layer 108 and binds to the base layer 104, in an alternative embodiment, the auxetic structure 112 can be formed on the substrate material 140, and a separate adhesive material, for example, a glue, can be applied in the shape of the auxetic structure 112. In such embodiments, the separate adhesive material infiltrates the reinforcement layer 108 and binds to the base layer 104 to impart the properties of the auxetic structure 112 to the reinforcement layer 108 and the base layer 104.

In some embodiments, the panel 100 is formed according to the method 200 above by stitching. More specifically, in such embodiments, the auxetic structure 112 is formed on the substrate material 140 by stitching, and the auxetic layer 110 is coupled to the reinforcement layer 108 and the base layer 104 by stitching.

In embodiments where the panel 100 is formed by stitching, the auxetic structure 112 is made of thread that is passed back and forth through the substrate material 140 to form the segments 24 on at least one of a first side and a second side of the substrate material 140. Each of these materials possesses elastomeric qualities of softness and flexibility.

In other words, in embodiments wherein the auxetic structure 112 is formed on the substrate material 140 by stitching, the segments 24 are formed as stitches. The segments 24 may be formed in the substrate material 140 in any of various stitching methods. By way of example, the auxetic structure 112 may be formed on the substrate material 140 via embroidering or sewing, either by hand or by machine.

FIGS. 8A-8G provide a schematic illustration of an embodiment wherein panel 100 is formed by stitching. As described in further detail below, the auxetic structure 112 is formed on the substrate material 140 via stitching, the auxetic structure 112 is also coupled to the reinforcement layer 108 and the base layer 104 by stitching, and the substrate material 140 is coupled to the reinforcement layer 108 and the base layer 104 by the auxetic structure 112.

Figure 8E:
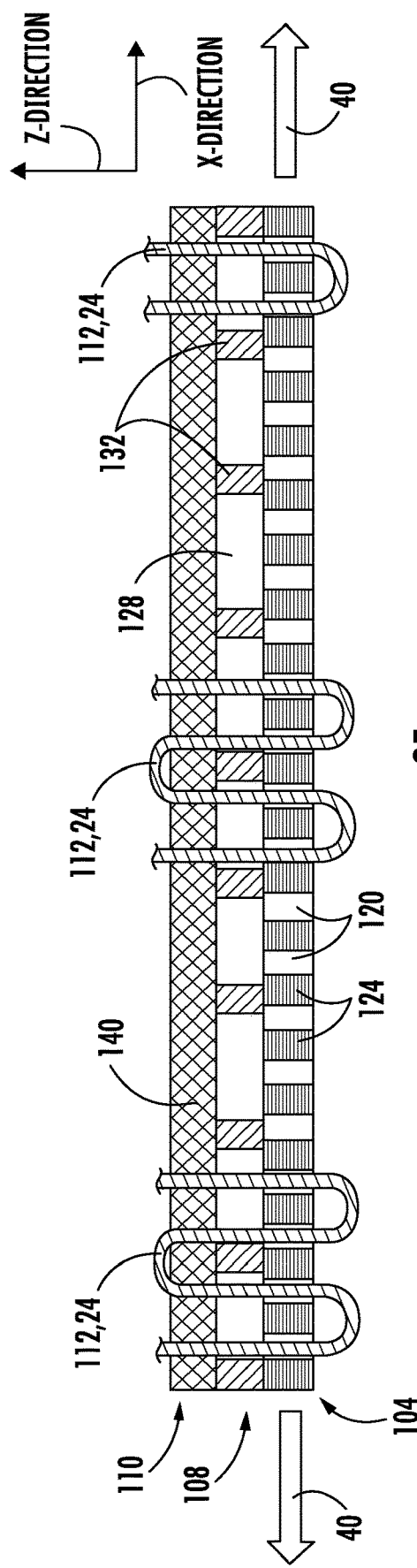
FIG. 8E is a diagram illustrating the panel of FIG. 1 in an embodiment of the panel formed by stitching including the base layer of FIG. 8A in the stretched configuration.

As described in the method 200 in association with block 204, forming the panel 100 includes first stretching the base layer 104 from the resting configuration (shown in FIG. 8A) into the stretched configuration (shown in FIG. 8B) by applying tension in the direction of the arrows 40. As discussed above, the base layer 104 can be stretched in either or both of the x-direction and the y-direction. By way of example, in FIGS. 8B-8E the arrows 40 are aligned along the x-direction of the material of the base layer 104. Additionally, the threads 124 of the base layer 104 are shown in a vertical configuration in FIGS. 8A-8G merely for the purpose of illustrating the locations of the threads 124 and that there are openings 120 between the threads 124. The illustrations shown in FIGS. 8A-8G are schematic representations only, and are not to scale. As shown in FIGS. 8A and 8B, stretching the base layer 104 into the stretched configuration elongates the base layer threads 124 and enlarges the base layer openings 120 (or increases the distance between each of the base layer threads 124) relative to the resting configuration.

As shown in FIG. 8C (and described above in association with block 208 of method 200), the reinforcement layer 108 is then applied or coupled to the base layer 104, while the base layer 104 is held in the stretched configuration. The reinforcement layer 108 is coupled to the base layer 104, for example, in the manner described above with respect to FIG. 7C.

As shown in FIG. 8D (and described above in association with block 212 of method 200), the substrate material 140 is then arranged on the reinforcement layer 108 opposite the base layer 104 while the base layer 104 is in the stretched configuration. In embodiments wherein the auxetic structure 112 is formed by stitching, the auxetic structure 112 is not formed on the substrate material 140 before the substrate material 140 is arranged on the reinforcement layer 108. In at least one embodiment, the substrate material 140 is coupled to the reinforcement layer 108. By way of example, the substrate material 140 is an elastomer sheet bonded or otherwise directly connected to the reinforcement layer 108 such that the two layers 140 and 108 function as a unitary structure. To this end, the substrate material 140 may be connected to the reinforcement layer 108 via adhesives, molding, welding, sintering, stitching or any of various other means. In an embodiment, the substrate material 140 is brought into contact with the reinforcement layer 108 and then heat is applied to place the material forming the auxetic layer in a semi-liquid (partially melted) state such that material of the auxetic layer in contact with the reinforcement layer infiltrates the reinforcement layer. Alternatively, the substrate material 140 is applied in a molten or semi-molten state. In either application, once cooled, the substrate material 140 is securely fixed (permanently connected) to the fibers 132 of the reinforcement layer 108 such that any movement of the substrate material 140 is transferred to the reinforcement layer 108, and vice versa.

As shown in FIG. 8E (and described above in association with blocks 212 and 216 of method 200), after the substrate material 140 has been arranged on the reinforcement layer 108, the auxetic structure 112 is applied to the substrate material 140, the reinforcement layer 108, and the base layer 104 by stitching the thread of the auxetic structure 112 through the substrate material 140, the reinforcement layer 108, and the base layer 104 simultaneously to form the segments 24 of the auxetic shape. Accordingly, the auxetic structure 112 is arranged on the substrate material 140, the reinforcement layer 108, and the base layer 104 in the same auxetic pattern described above.

Although in this embodiment, the auxetic structure 112 is applied to the substrate material 140, the substrate material 140 is not acting purely as a substrate. More specifically, in this embodiment, the substrate material 140 is acting as another layer in cooperation with the base layer 104 to sandwich the reinforcement layer 108. The auxetic structure 112 is then stitched through all three of the substrate material 140, the reinforcement layer 108, and the base layer 104.

As noted above, the segments 24 of the auxetic structure 112 may be formed in the substrate material 140 in any of various stitching methods. Accordingly, because the segments of the auxetic structure 112 are simultaneously formed by stitching through the substrate material 140, the reinforcement layer 108, and the base layer 104, the auxetic structure 112 may be also formed on the reinforcement layer 108 and the base layer 104 in any of various stitching methods, for example, embroidering or sewing, either by hand or by machine.

The segments 24 of the auxetic structure 112 do not cover the entirety of the reinforcement layer 108, but the material of the auxetic structure 112 at least partially fills some of the reinforcement layer openings 128 as the material passes through those reinforcement layer openings 128. Similarly, the material of the auxetic structure 112 at least partially fills some of the base layer openings 120 as the material passes through those base layer openings 120. Accordingly, the material of the segments 24 of the auxetic structure is simultaneously in contact with the substrate material 140, the reinforcement layer 108, and the base layer 104, and binds those layers together.

Figure 8F:
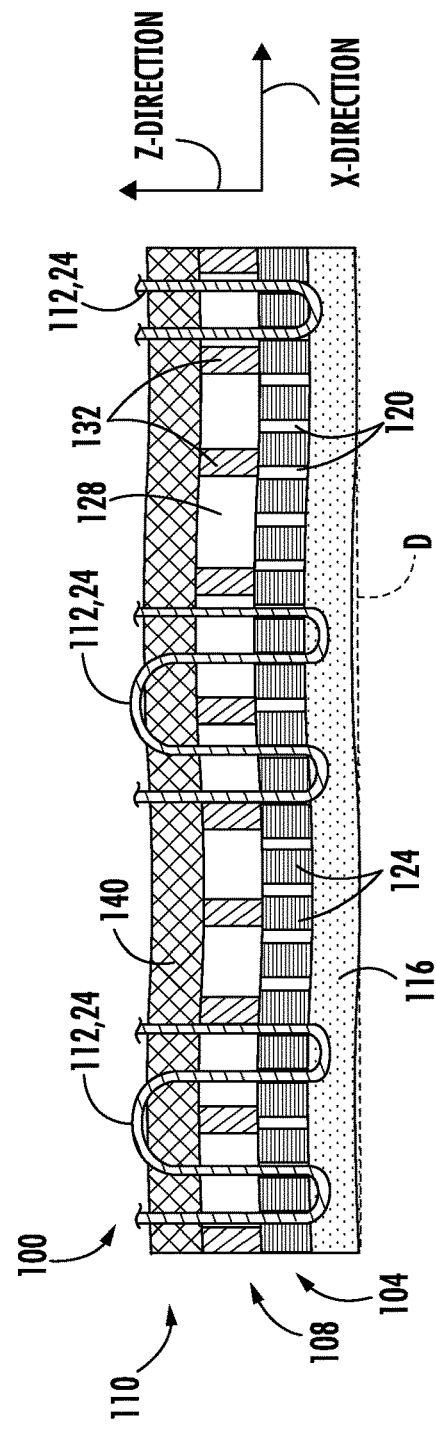
FIG. 8F is a diagram illustrating the panel of FIG. 1 in an embodiment of the panel formed by stitching including the base layer of FIG. 8A in a resting configuration.

As shown in FIG. 8F (and described above in association with block 220 of method 200), after the auxetic structure 112 is coupled to the substrate material 140, the reinforcement layer 108, and the base layer 104, the lining layer 116 is applied to the base layer 104 opposite the reinforcement layer 108. As mentioned above, in some alternative embodiments, the lining layer 116 is not included in the panel 100. In embodiments including a lining layer 116, the lining layer 116 is coupled to the base layer 104, for example, in the manner described above with respect to FIG. 7F. In embodiments where the panel 100 is formed by stitching, the lining layer 116 is particularly useful for covering the threads of the auxetic structure 112 that have passed through the base layer 104 as shown in FIG. 8F. Accordingly, although the stitching is shown in FIG. 8F as extending partially into the lining layer 116, this is shown to illustrate that in at least some embodiments the lining layer 116 covers the stitching that has passed through the base layer 104, but the stitching does not pass partially into or through the lining layer 116. However, in at least some embodiments, the stitching may pass through the lining layer 116.

After the lining layer is applied to the base layer, the applied tension is then released from the base layer 104 to enable the base layer 104 to return to the resting configuration (as described above in association with block 224 of method 200). Because the base layer 104 is coupled to the auxetic structure 112 by the segments 24, when the material of the base layer 104 contracts to return to the resting configuration, the remainder of the panel 100 puckers or buckles, including layers 108, 110, and 116.

As illustrated by the dashed line D in FIG. 8F, this puckering or buckling raises and lowers the substrate material 140, the auxetic structure 112, the reinforcement 108, the base layer, and the lining layer 116 in the z-direction. Accordingly, the panel 100 puckers or buckles to provide the panel 100 with surface irregularities in the z-direction. As in embodiments wherein the auxetic structure 112 is coupled by adhesion, in embodiments wherein the auxetic structure 112 is coupled by stitching, the puckering or buckling does not change the thickness of the panel 100 or of the layer of the panel 100, but forms a patterned structure in the panel 100 along which layers of the panel 100 are raised in the z-direction.

As discussed above with respect to embodiments wherein the auxetic structure 112 is applied to the panel 100 by adhesion, in in embodiments wherein the auxetic structure 112 is applied to the panel 100 by stitching, providing the panel 100 with surface irregularities in the z-direction when the base layer 104 is in the resting configuration provides material in the panel 100 that is available to flatten out when the panel 100 is stretched in the x-direction and/or the y-direction and therefore better accommodates stretching of the article of apparel during wearing and/or use. Accordingly, the material of the lining layer 116 and the material of the reinforcement layer 108, each of which has a relatively high modulus of elasticity, are not required to stretch under the forces applied during normal donning, wearing, and/or using the article of apparel, but instead flatten in the z-direction as the base layer 104 stretches in the x-direction and/or y-direction under the forces applied during normal donning, wearing, and/or using the article of apparel. Additionally, the reinforcement layer 108, which has a relatively high modulus of elasticity, limits the stretch of the panel 100 in the x-direction and/or the y-direction.

Figure 8G:
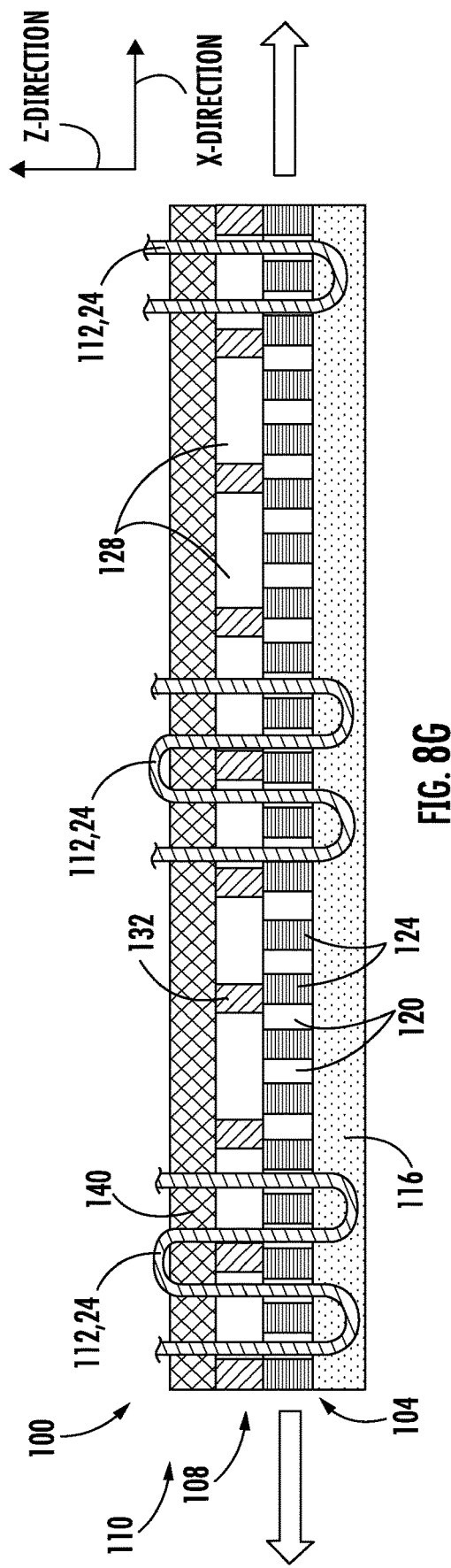
FIG. 8G is a diagram illustrating the panel of FIG. 1 in a stretched configuration.

As shown in FIG. 8G, when the panel 100 is subsequently stretched under applied tension during normal donning, wearing, and/or use of the article of apparel, the relative inelasticity of the material of the reinforcement layer 108 resists stretching the panel 100 beyond the arrangement of the reinforcement layer 108 when the reinforcement layer 108 is originally applied to the base layer 104. In other words, the reinforcement layer 108 is in a resting configuration when it is applied to the base layer 104, which is in the stretched configuration. When the base layer 104 contracts back to its resting configuration, the reinforcement layer 108 is in a contracted configuration (shown in FIG. 8F). The reinforcement layer 108 thus limits the stretch of the panel 100 back to the resting configuration of the reinforcement layer 108. This limitation of the amount of stretch of the panel 100 by the reinforcement layer 108 is also referred to as "lockout."

Accordingly, the panel 100 is configured to stretch in the x-direction and/or the y-direction by stretching the base layer 104 in the x-direction and the y-direction. The auxetic shape of the panel 100 provided by the auxetic structure 112 enables the substrate material 140, the auxetic structure 112, the reinforcement layer 108, and the lining layer 116 to accommodate the stretch of the base layer 104 in the x-direction and/or the y-direction by flattening or rising in the z-direction. However, to protect the integrity of the panel 100 and prevent damage, the reinforcement layer 108 limits (or "locks out") the stretch of the panel 100 in the x-direction and/or the y-direction. Accordingly, the reinforcement layer 108 provides structural reinforcement and rigidity to the panel 100 while still accommodating the desired stretch in the x-direction and/or the y-direction.

When the base layer 104 is in the resting configuration, the surface irregularities of the panel 100 in the z-direction lifts some of the lining layer 116 away from the body of the wearer or user. In other words, less surface area of the panel 100 is in contact with the body of the wearer or user, which improves the fit as well as moisture wicking capabilities of the article of apparel.

Moreover, because the auxetic structure 112 is integrated into the panel 100 in this manner, the stretch of the base layer 104, the reinforcement layer 108, and the panel 100 as a whole are guided by the auxetic structure 112 in the manner described above with respect to the substrate material 140.

In embodiments of the panel 100 formed by either adhesion or stitching, the auxetic structure 112 can be applied in the arrangement shown in FIG. 3A or FIG. 3B. In embodiments wherein the auxetic structure 112 is applied in the arrangement shown in FIG. 3A, upon being stretched, the auxetic shape will expand to the arrangement shown in FIG. 3B. Alternatively, in embodiments wherein the auxetic structure 112 is applied in the arrangement shown in FIG. 3B, upon being stretched, the auxetic shape will further expand in the same manner to a further expanded arrangement. Moreover, in embodiments wherein the auxetic structure 112 is applied in the arrangement shown in FIG. 3B, when applied tension is released, the auxetic shape will contract to the arrangement shown in FIG. 3A. In embodiments wherein the auxetic structure is applied in the arrangement shown in FIG. 3A, when applied tension is released, the auxetic shape will further contract in the same manner to a further contracted arrangement.

In some embodiments, the panel 100 is applied to articles of footwear, as illustrated in FIGS. 9A, 9B, 10 and 11A-11C. In such embodiments, the auxetic structure is selectively applied to particular regions of the article of footwear to provide expansion areas with controlled lockout. Each of the shoes 300 includes a forefoot region 304 arranged at the user's forefoot when the shoe is worn, a midfoot region 308 arranged at the user's midfoot and a heel region 312 arranged at the user's heel when the shoe is worn.

Figure 9A:
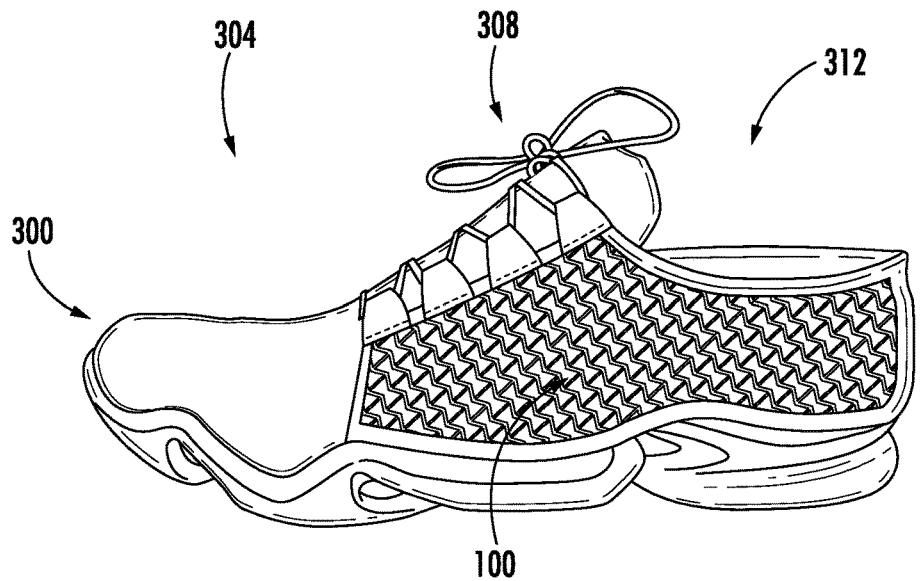
FIG. 9A is a perspective view of an exemplary embodiment of the panel of FIG. 1 applied to an article of footwear.
Figure 9B:
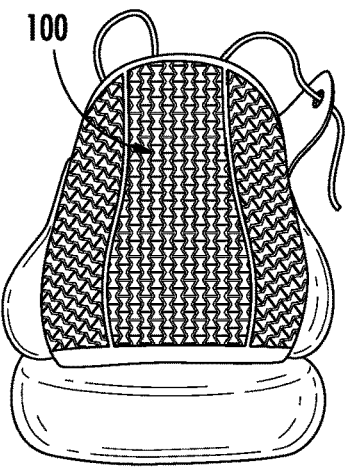
FIG. 9B is a rear view of the article of footwear shown in FIG. 9A.

The shoe 300 shown in FIGS. 9A and 9B includes panels forming the rear of the upper. A first of the panels 100 is arranged at the midfoot region 308 and extends to the hindfoot region 312. A second of the panels 100 is arranged at the heel region 312 and extends to the midfoot region 308. Accordingly, these regions 308, 312 of the shoe 300 exhibit the stretch and the lockout properties imparted by the panel 100. This can be advantageous to control the amount of stretch in the area of the user's midfoot and heel.

Figure 10:
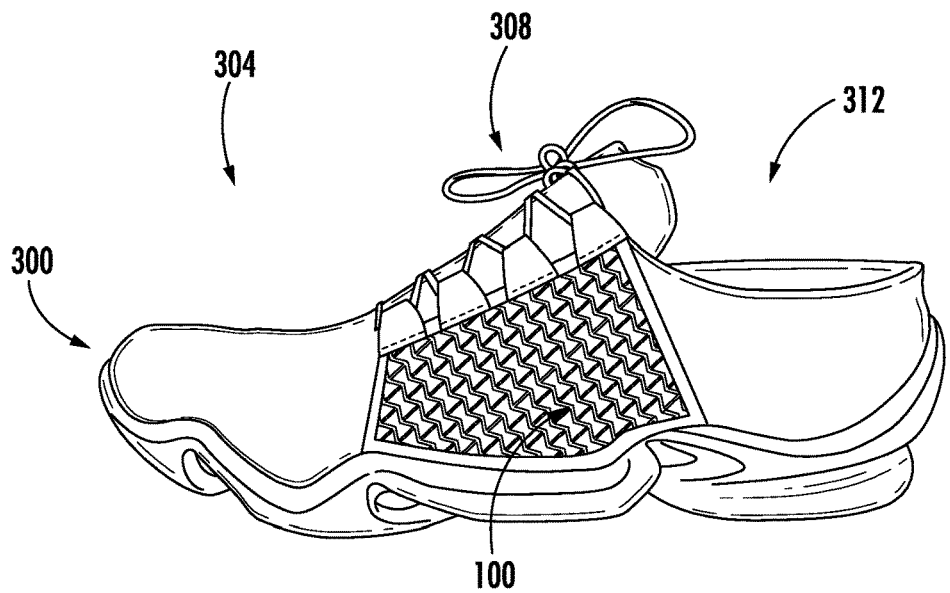
FIG. 10 is a perspective view of another exemplary embodiment of the panel of FIG. 1 applied to an article of footwear.

The shoe 300, shown in FIG. 10, includes at least one panel 100 arranged at the midfoot region 308, but does not include a panel 100 arranged at the forefoot region 304 or the heel region 312. Accordingly, the midfoot region 304 of the shoe 300 exhibits the stretch and the lockout properties imparted by the panel 100. This can be advantageous to control the amount of stretch in the area of the user's midfoot. Additionally, applying the auxetic structure to the midfoot region 308 of the shoe 300 also provides the improved fit, comfort, and moisture wicking advantages, discussed above, to that region. In various embodiments, the shoe 300 may include a panel 100 arranged at the midfoot region 308 on the lateral side of the shoe, facing toward the user's midline, the medial side of the shoe, facing away from the user's midline, or both.

Figure 11A:
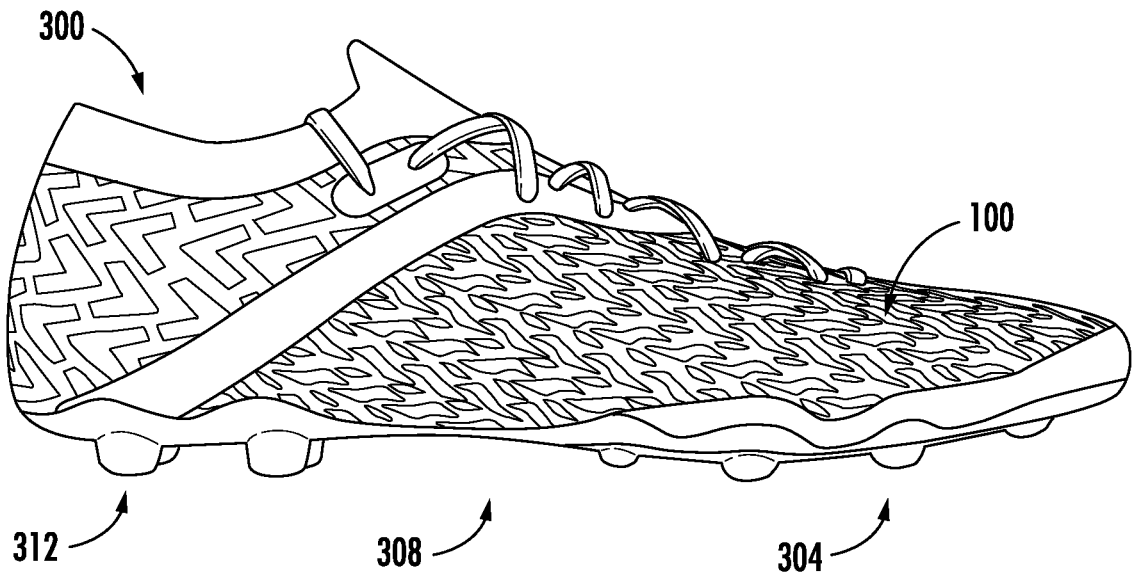
FIG. 11A is a lateral side view of an article of footwear in accordance with the invention.
Figure 11B:
FIG. 11B is a perspective view of the article of footwear shown in FIG. 11A.
Figure 11C:
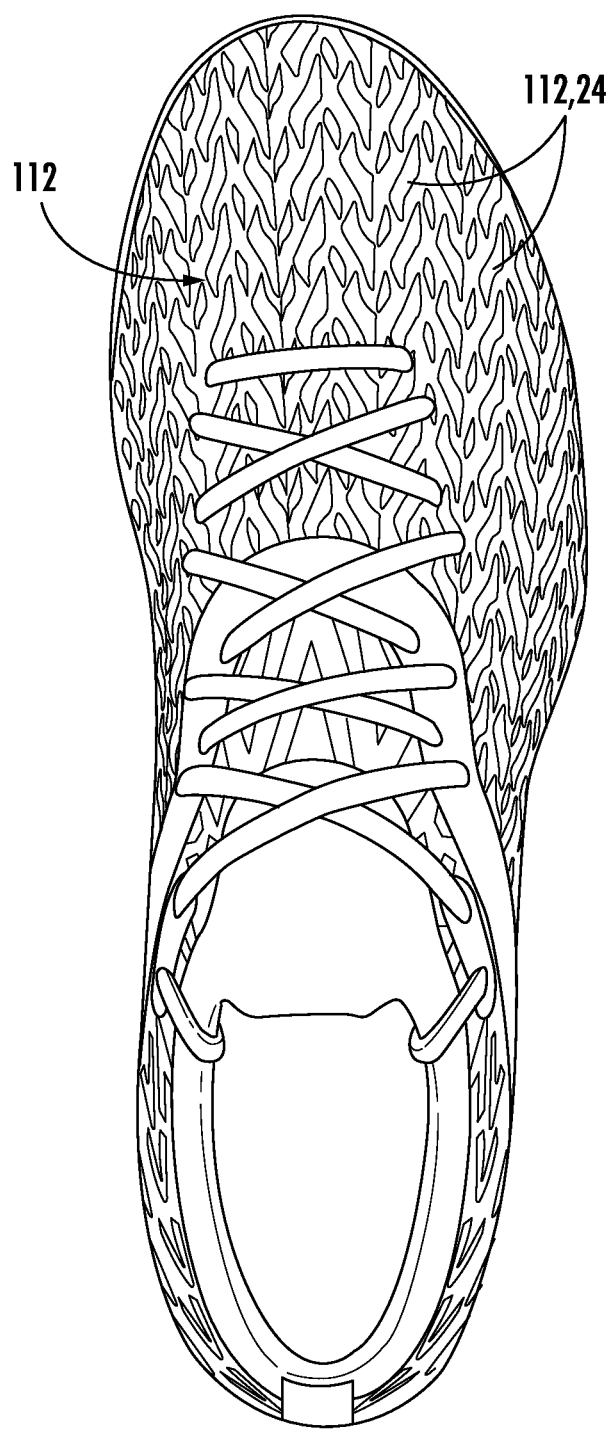
FIG. 11C is a top view of the article of footwear shown in FIG. 11A.

In FIGS. 11A, 11B and 11C, the article of footwear includes a single panel 100 extending from the hindfoot region 312, through the midfoot 308 region, and to the forefoot region 304, spanning the lateral and medial sides of the shoe. With the configuration, the panel 100 enables dynamic expansion of the upper during use (e.g., during a sporting activity), with the auxetic structure expanding until the point of lockout as explained above.

The shoes 300 are provided as exemplary embodiments of articles of footwear including panels 100. In alternative embodiments, more or fewer panels can be arranged in various locations on an article of footwear to control the amount of stretch at each portion of the article of footwear as desired.

The foregoing detailed description of one or more exemplary embodiments of the articles of apparel including auxetic structures has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed exemplary embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the exemplary embodiments contained herein.

What is claimed is:

1. An article of footwear comprising:
   a base layer comprising an elastic material, the base layer elastically deformable between a resting configuration and a stretched configuration, wherein the base layer is stretched a stretch amount when in the stretched configuration;
   an inelastic reinforcement layer coupled to the base layer, the reinforcement layer comprising a plurality of apertures and configured to delimit the stretch amount of the base layer when the base layer is in the stretched configuration; and
   an auxetic structure coupled to the reinforcement layer, wherein the auxetic structure is formed on a substrate material with the base layer and the substrate material arranged on opposite facing sides of the reinforcement layer, and wherein the auxetic structure is formed of an adhesive that at least partially fills at least a portion of the plurality of apertures of the reinforcement layer and simultaneously contacts the substrate material, the reinforcement layer, and the base layer.

2. The article of footwear of claim 1 wherein the reinforcement layer is puckered when the base layer is in the resting configuration.

3. The article of footwear of claim 1, wherein the auxetic structure includes a plurality of interconnected segments defining a repeating pattern of voids, wherein each void has a reentrant shape.

4. The article of footwear of claim 1, further comprising a lining layer coupled to the base layer such that the lining layer and the reinforcement layer are arranged on opposite facing sides of the base layer.

5. The article of footwear of claim 1 wherein the auxetic structure lowers a Poisson's ratio of the substrate material.

6. The article of footwear of claim 1 wherein the adhesive is a thermoplastic adhesive material.

7. The article of footwear of claim 1 wherein the adhesive is one of ethylene-vinyl acetate, nylon, polyurethane, polypropylene, or polyethylene.

8. The article of footwear of claim 1 wherein the adhesive is auxetic foam.

9. An article of footwear comprising:
   a base layer comprising an elastic material, the base layer elastically deformable between a resting configuration and a stretched configuration, wherein the base layer is stretched a stretch amount when in the stretched configuration;
   an inelastic reinforcement layer coupled to the base layer, the reinforcement layer configured to delimit the stretch amount of the base layer when the base layer is in the stretched configuration; and
   an auxetic structure coupled to the reinforcement layer, wherein the auxetic structure is formed on a substrate material with the base layer and the substrate material arranged on opposite facing sides of the reinforcement layer, and wherein the auxetic structure is formed as a plurality of stitches that pass through the substrate material and the reinforcement layer such that the substrate material is coupled to the reinforcement layer and the reinforcement layer is coupled to the base layer via the stitches.

10. The article of footwear of claim 9, further comprising a lining layer coupled to the base layer such that the lining layer and the reinforcement layer are arranged on opposite facing sides of the base layer.

11. The article of footwear of claim 9 wherein the reinforcement layer is puckered when the base layer is in the resting configuration.

12. The article of footwear of claim 9, wherein the auxetic structure includes a plurality of interconnected segments defining a repeating pattern of voids, wherein each void has a reentrant shape.

13. The article of footwear of claim 10, wherein the plurality of stitches does not pass into or through the lining layer.

14. The article of footwear of claim 9, wherein the plurality of stitches are embroidery stitches.

15. An article of footwear, comprising:
   a sole structure; and
   an upper, the upper comprising:
      a base layer comprising an elastic material, the base layer elastically deformable between a resting configuration and a stretched configuration, wherein the base layer is stretched a stretch amount when in the stretched configuration,
      an inelastic reinforcement layer comprising a plurality of apertures coupled to the base layer, wherein the reinforcement layer is in a puckered configuration when the base layer is in the resting configuration and the reinforcement layer is configured to delimit an amount of stretch of the base layer when the base layer is in the stretched configuration, and
      a substrate material applied to an opposite side of the reinforcement layer than the base layer, the substrate material forming an auxetic structure defining a repeating pattern of perimeter walls and interior recesses, wherein the auxetic structure is formed of an adhesive that at least partially fills at least a portion of the plurality of apertures of the reinforcement layer and simultaneously contacts the substrate material, the reinforcement layer, and the base layer.

16. The article of footwear of claim 15, further comprising a lining layer coupled to the base layer such that the lining layer and the reinforcement layer are arranged on opposite facing sides of the base layer.

17. The article of footwear of claim 15 wherein the auxetic structure lowers a Poisson's ratio of the substrate material.

18. The article of footwear of claim 15 wherein the adhesive is a thermoplastic adhesive material.

19. The article of footwear of claim 15 wherein the adhesive is one of ethylene-vinyl acetate, nylon, polyurethane, polypropylene, or polyethylene.

20. The article of footwear of claim 15 wherein the adhesive is auxetic foam.

\* \* \* \* \*